(12) United States Patent
Yokoyama et al.

(10) Patent No.: US 12,019,804 B2
(45) Date of Patent: Jun. 25, 2024

(54) INFORMATION PROCESSING SYSTEM, TACTILE PRESENTATION APPARATUS, TACTILE PRESENTATION METHOD, AND STORAGE MEDIUM

(71) Applicant: SONY GROUP CORPORATION, Tokyo (JP)

(72) Inventors: Ryo Yokoyama, Tokyo (JP); Osamu Ito, Tokyo (JP); Ryuichi Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 326 days.

(21) Appl. No.: 17/291,072

(22) PCT Filed: Oct. 24, 2019

(86) PCT No.: PCT/JP2019/041594
§ 371 (c)(1),
(2) Date: May 4, 2021

(87) PCT Pub. No.: WO2020/100543
PCT Pub. Date: May 22, 2020

(65) Prior Publication Data
US 2022/0035454 A1 Feb. 3, 2022

(30) Foreign Application Priority Data
Nov. 14, 2018 (JP) .................. 2018-213997

(51) Int. Cl.
*G06F 3/01* (2006.01)
*G06F 3/03* (2006.01)

(52) U.S. Cl.
CPC .............. *G06F 3/016* (2013.01); *G06F 3/011* (2013.01); *G06F 3/03* (2013.01)

(58) Field of Classification Search
CPC ............. G06F 3/016; G06F 3/011; G06F 3/03
See application file for complete search history.

(56) References Cited

U.S. PATENT DOCUMENTS

| 2010/0079263 A1* | 4/2010 | Anabuki .............. G09B 21/003 340/407.1 |
|---|---|---|
| 2012/0286944 A1 | 11/2012 | Forutanpour et al. |
| 2014/0114445 A1 | 4/2014 | Gaudina et al. |

FOREIGN PATENT DOCUMENTS

| CN | 103534666 A | 1/2014 |
|---|---|---|
| CN | 103748532 A | 4/2014 |

(Continued)

OTHER PUBLICATIONS

International Search Report and Written Opinion of PCT Application No. PCT/JP2019/041594, dated Nov. 26, 2019, 10 pages of ISRWO.

*Primary Examiner* — Curtis B Odom
(74) *Attorney, Agent, or Firm* — CHIP LAW GROUP

(57) ABSTRACT

There is provided an information processing system including: an information processor; and a plurality of tactile presentation apparatuses, the plurality of tactile presentation apparatuses including a first tactile presentation apparatus that, in a case of receiving tactile presentation information from the information processor, transmits the tactile presentation information to peripheral tactile presentation apparatus, and a second tactile presentation apparatus that, in a case of receiving the tactile presentation information from the peripheral tactile presentation apparatus, presents a tactile stimulus on a basis of the tactile presentation information.

18 Claims, 22 Drawing Sheets

(56) References Cited

FOREIGN PATENT DOCUMENTS

| | | |
|---|---|---|
| CN | 106133650 A | 11/2016 |
| CN | 107589830 A | 1/2018 |
| CN | 108780359 A | 11/2018 |
| IT | 20110530 A1 | 12/2012 |
| JP | 2014-519669 A | 8/2014 |
| JP | 2016-192229 A | 11/2016 |
| JP | 2017-228093 A | 12/2017 |
| KR | 10-2014-0015536 A | 2/2014 |
| KR | 10-2014-0053954 A | 5/2014 |
| WO | 2012/158641 A1 | 11/2012 |
| WO | 2012/172487 A1 | 12/2012 |
| WO | 2018/008217 A1 | 1/2018 |

\* cited by examiner

[FIG. 1]
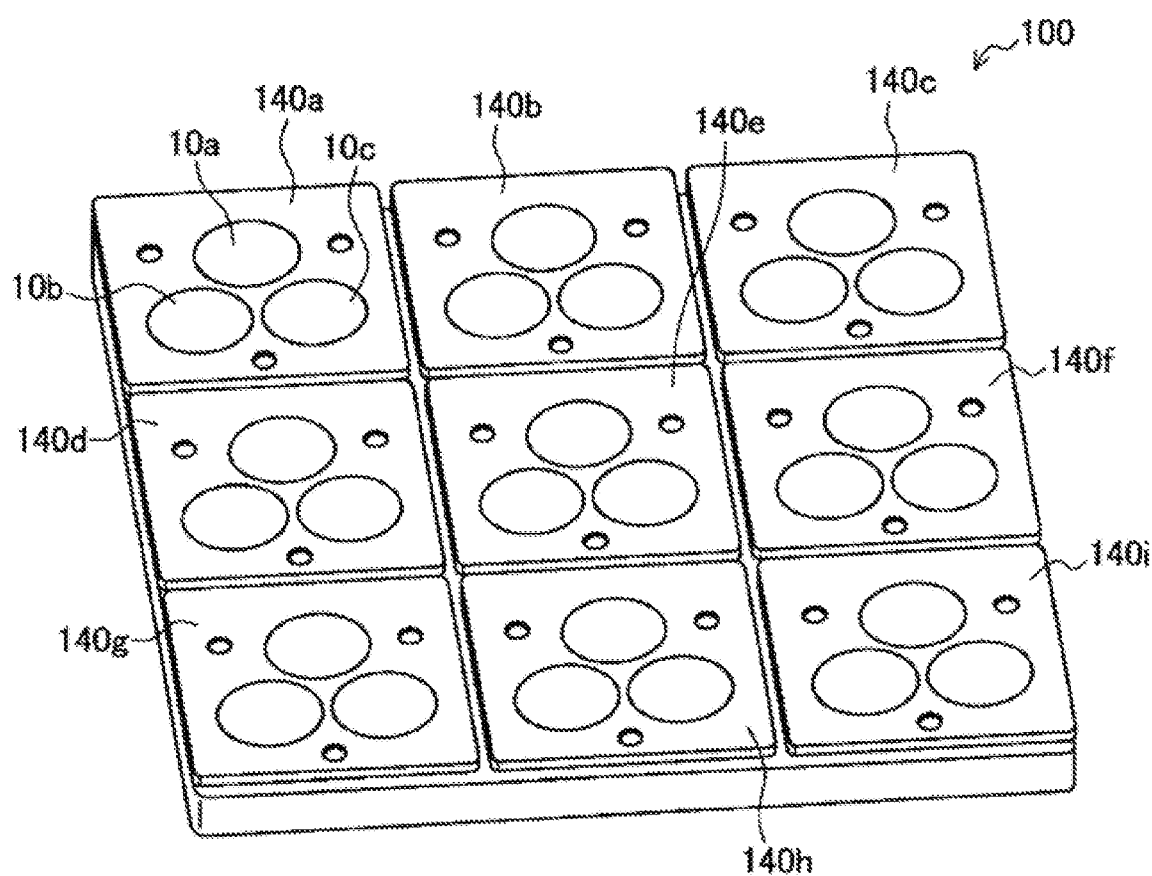

[FIG. 2]
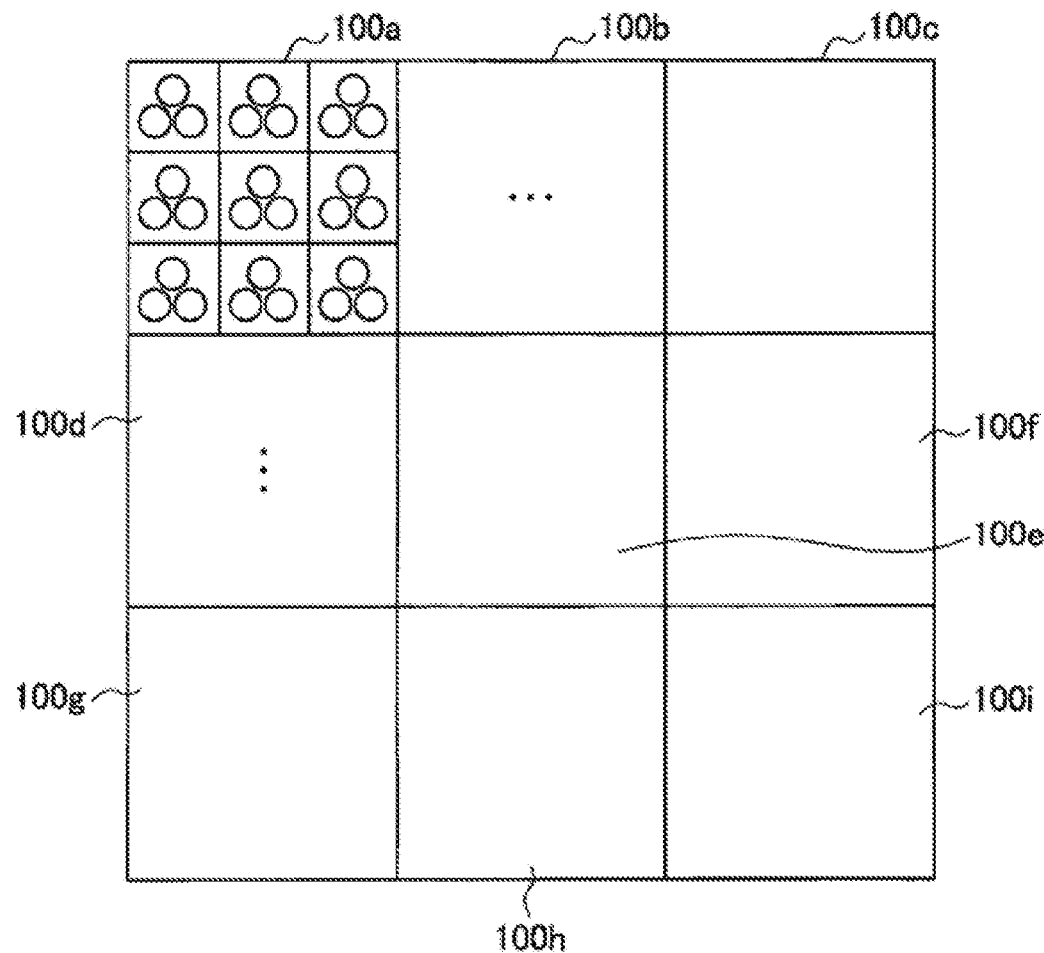
[FIG. 3]
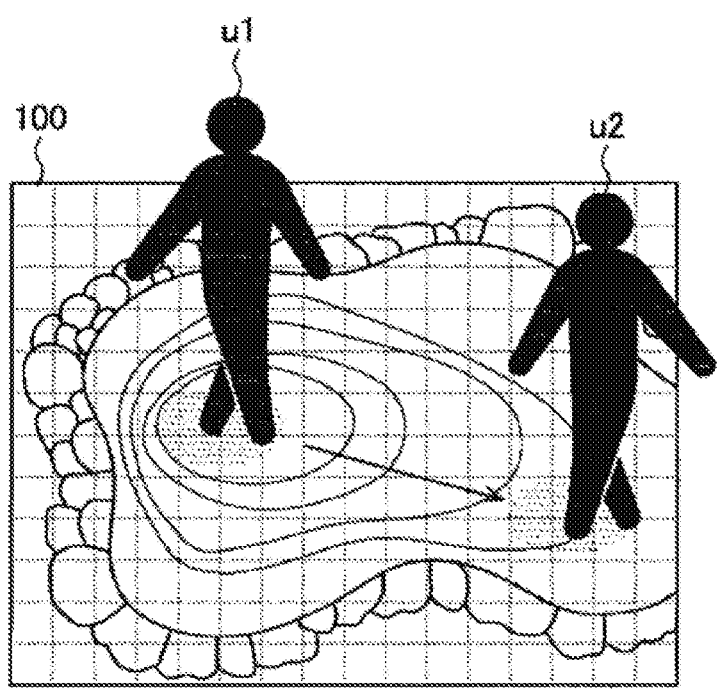

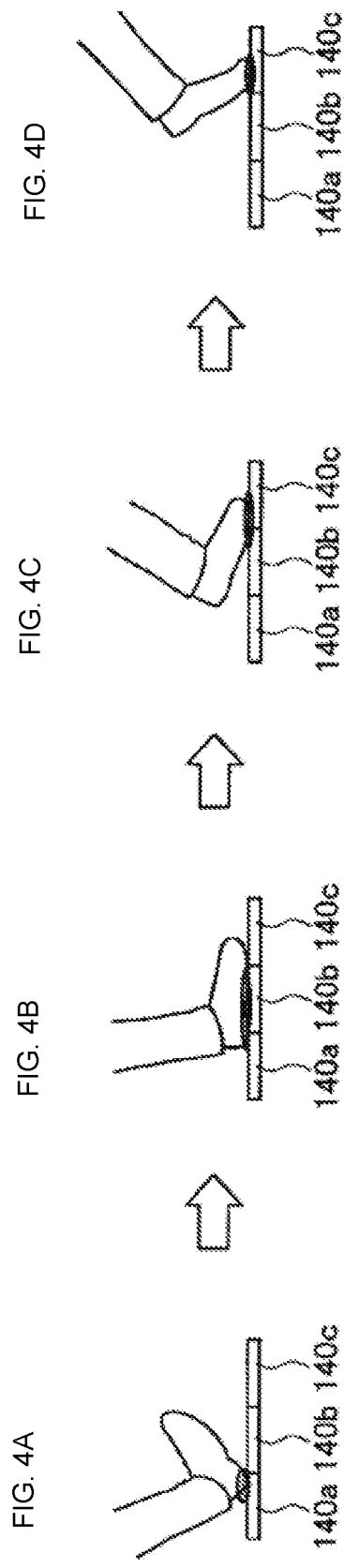

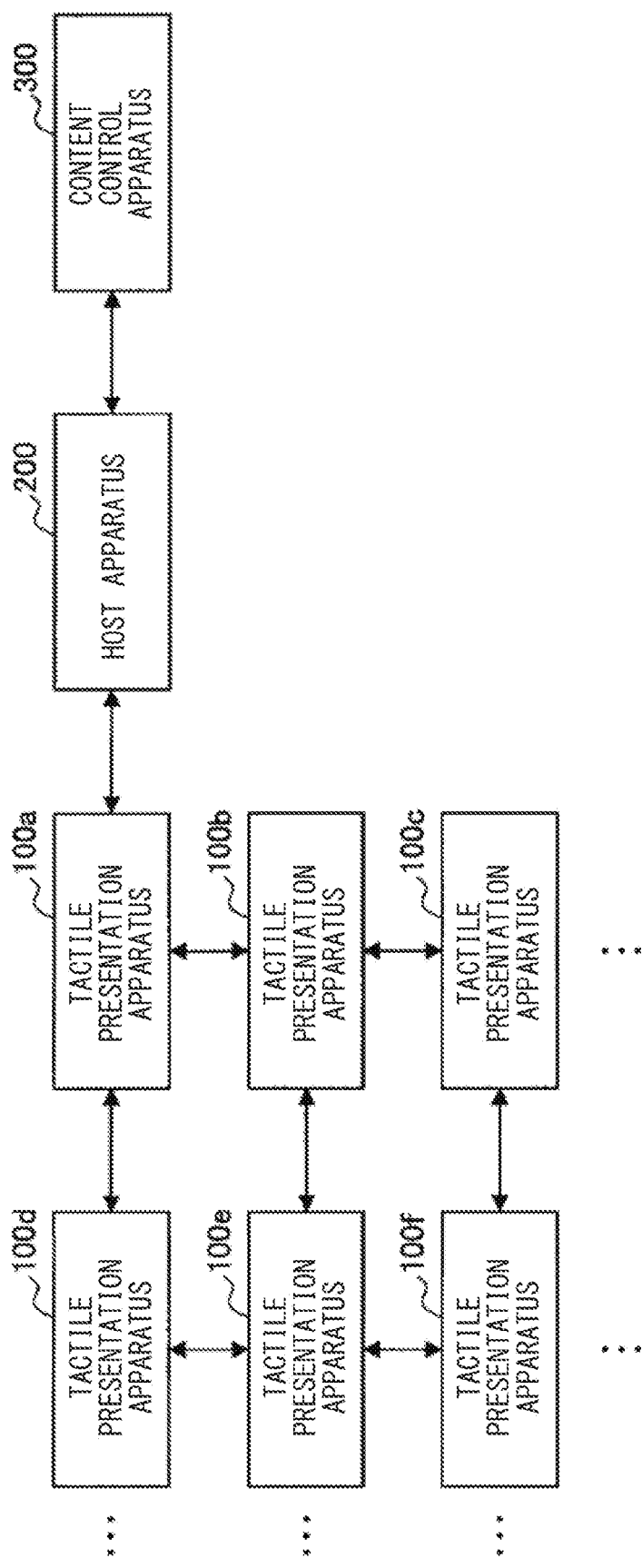

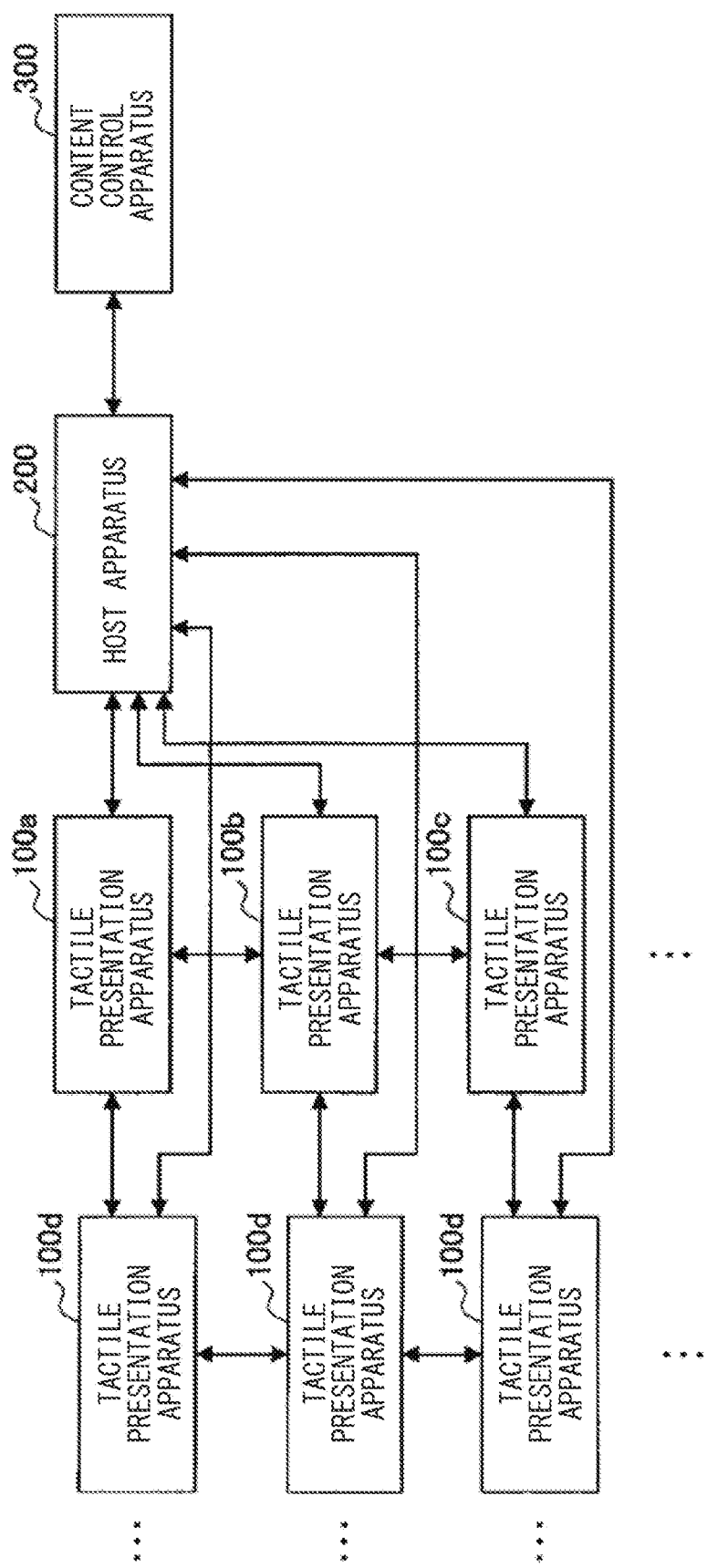
[FIG. 6]

[FIG. 7]
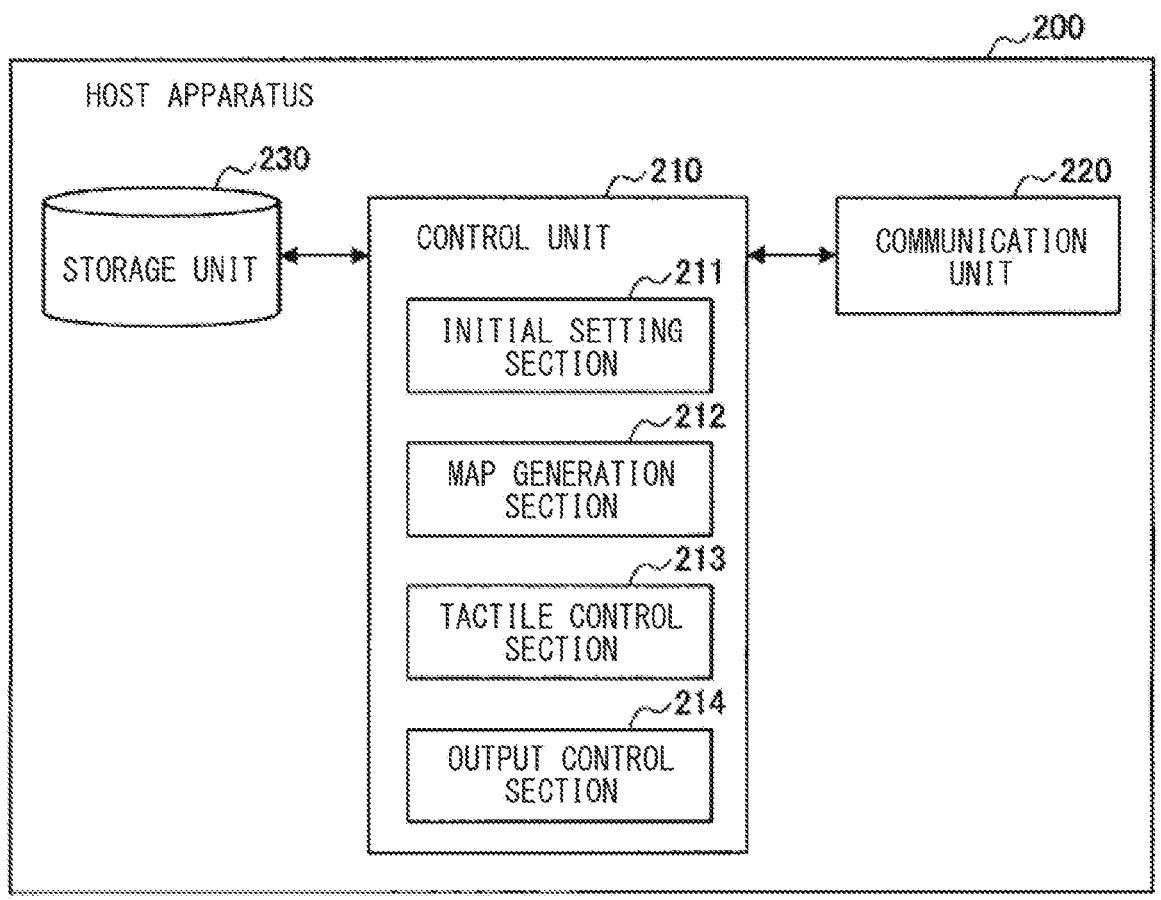

[FIG. 8]

| ID: DEVICE ID (IDENTIFICATION INFORMATION ON TACTILE PRESENTATION APPARATUS) | ID: COMMAND ID (IDENTIFICATION INFORMATION ON TACTILE PRESENTATION INFORMATION) | DATA (DETAIL OF TACTILE STIMULUS) |

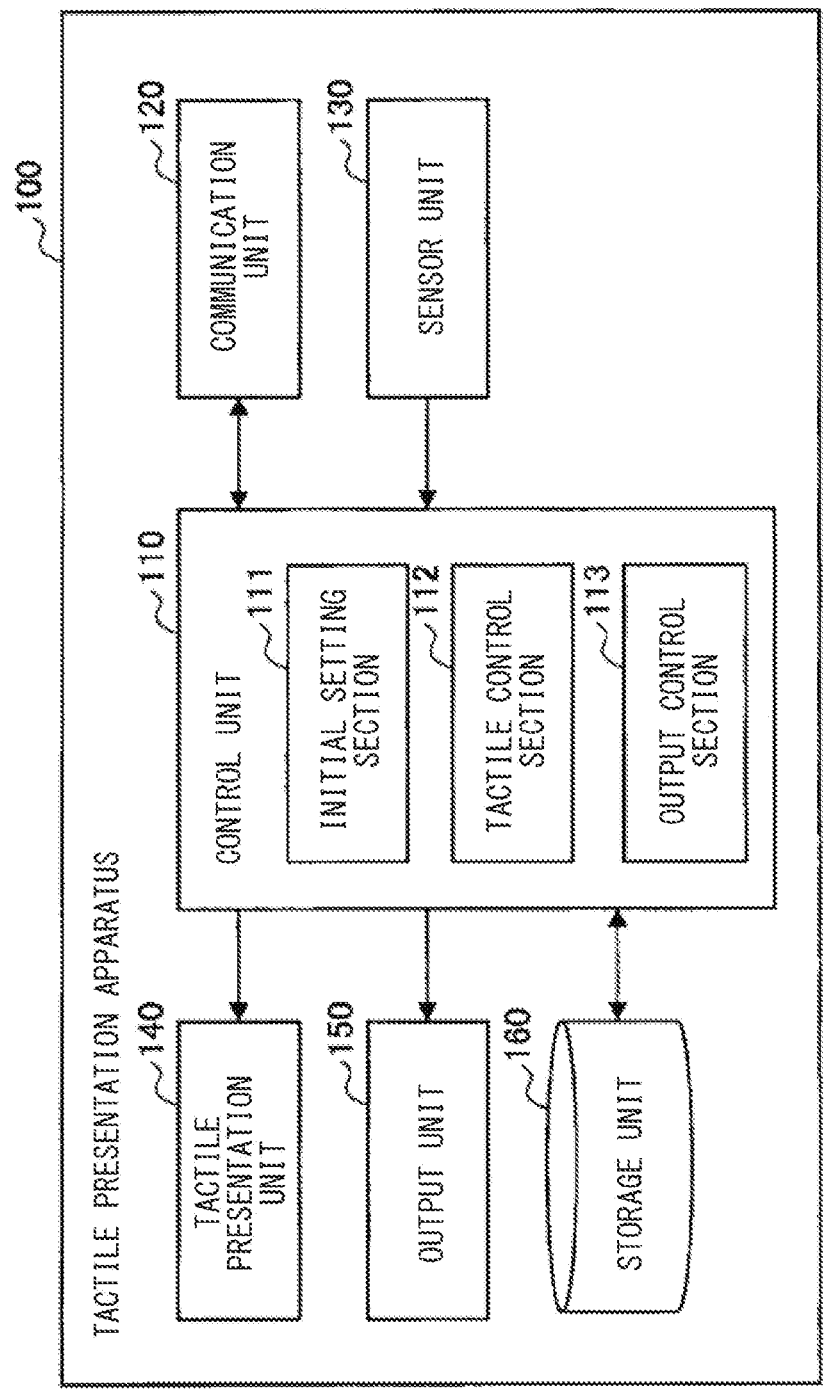
[FIG. 9]

[FIG. 10]
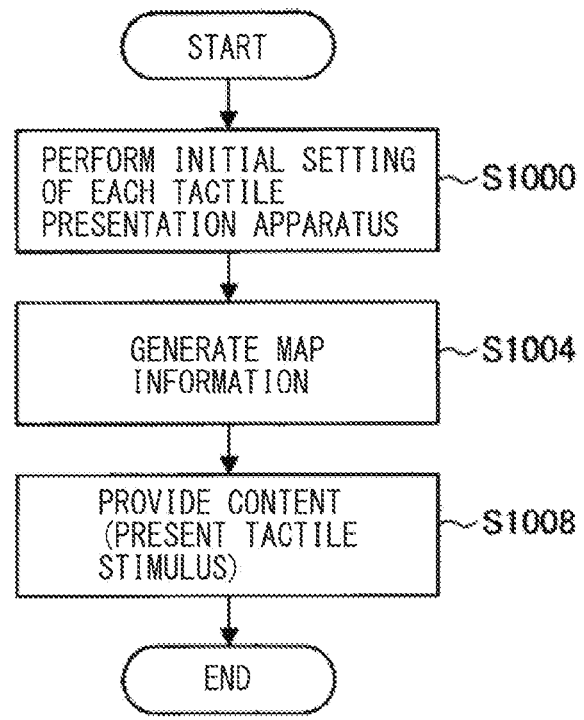

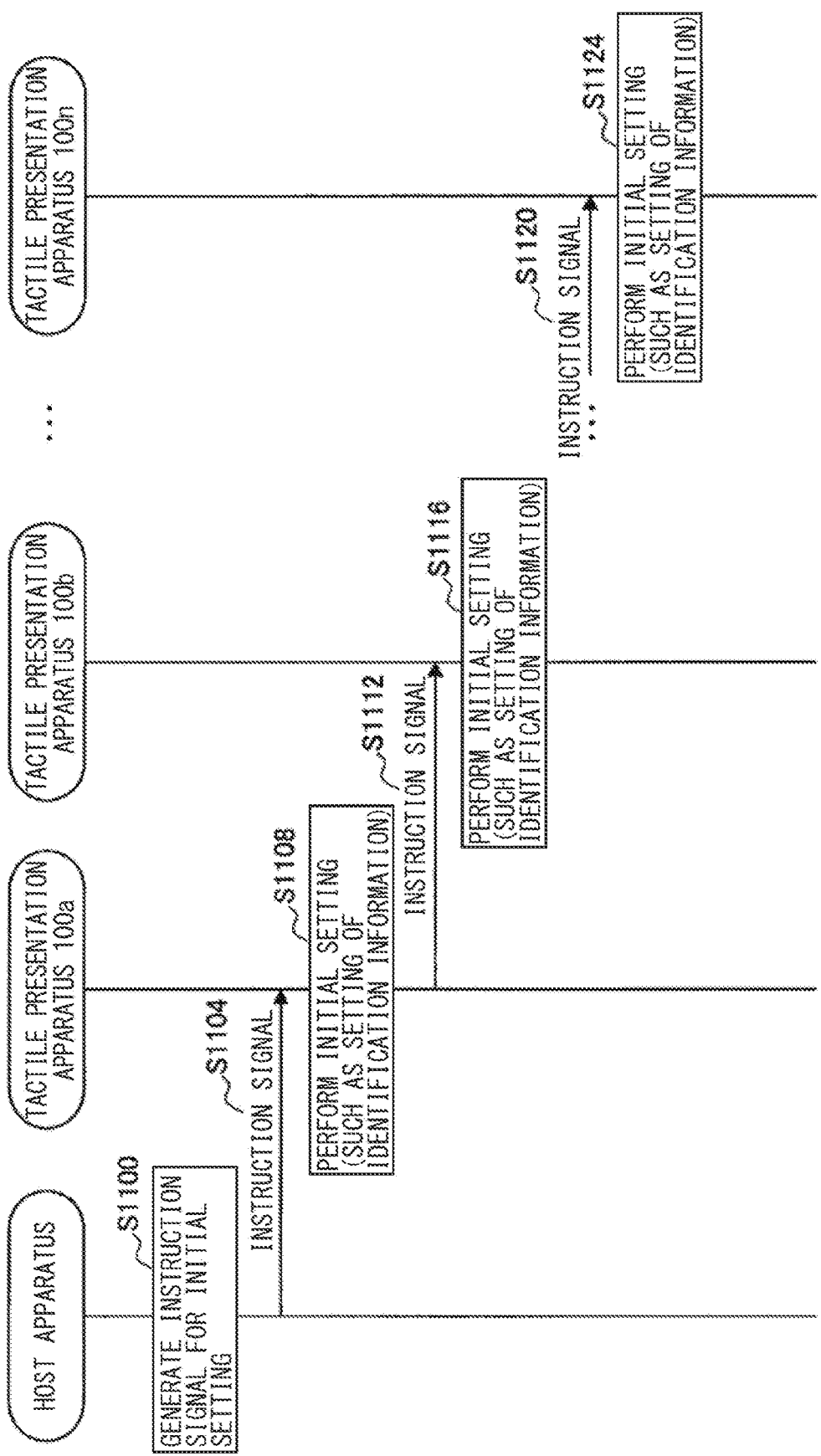

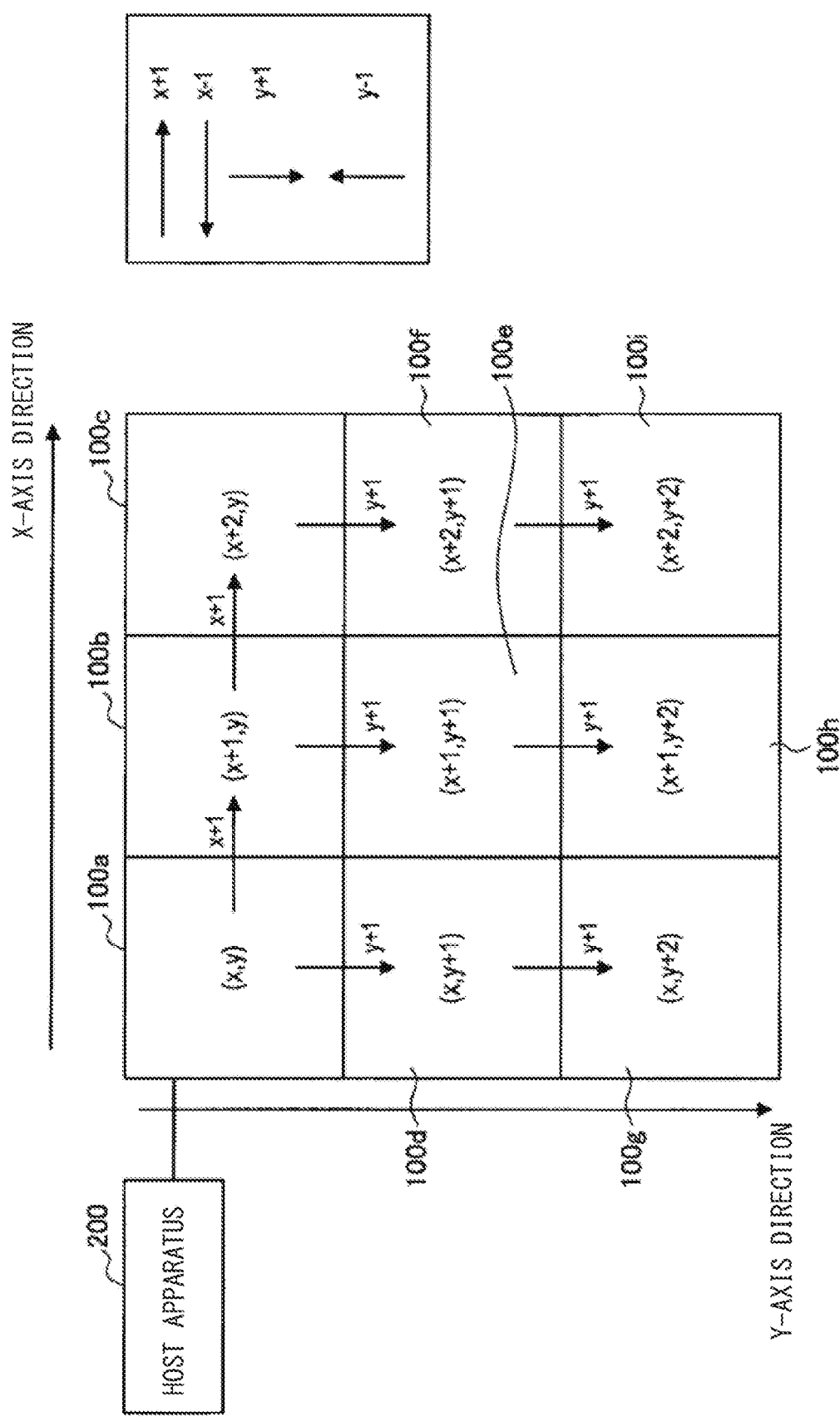
[FIG. 12]

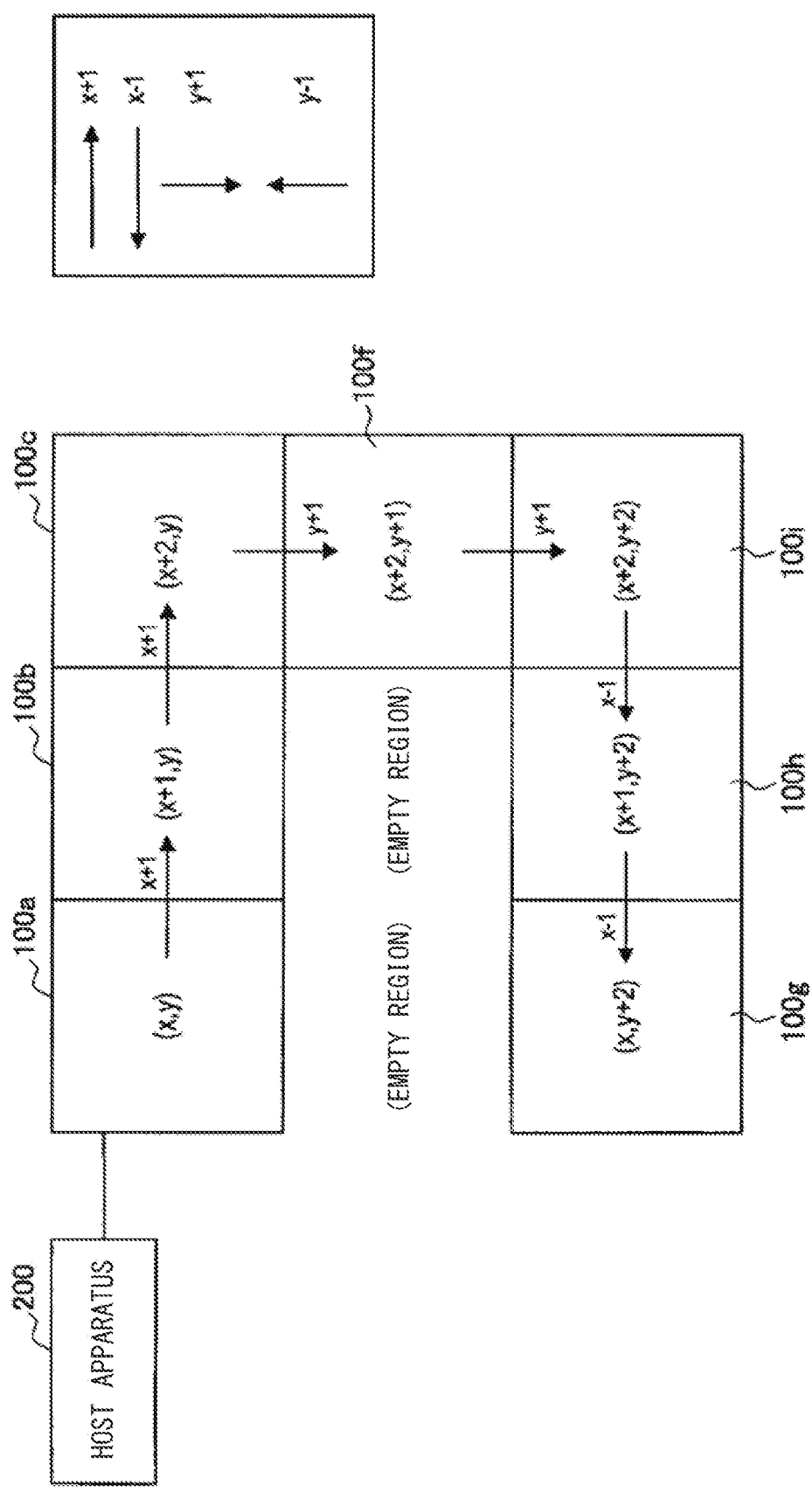
[FIG. 13]

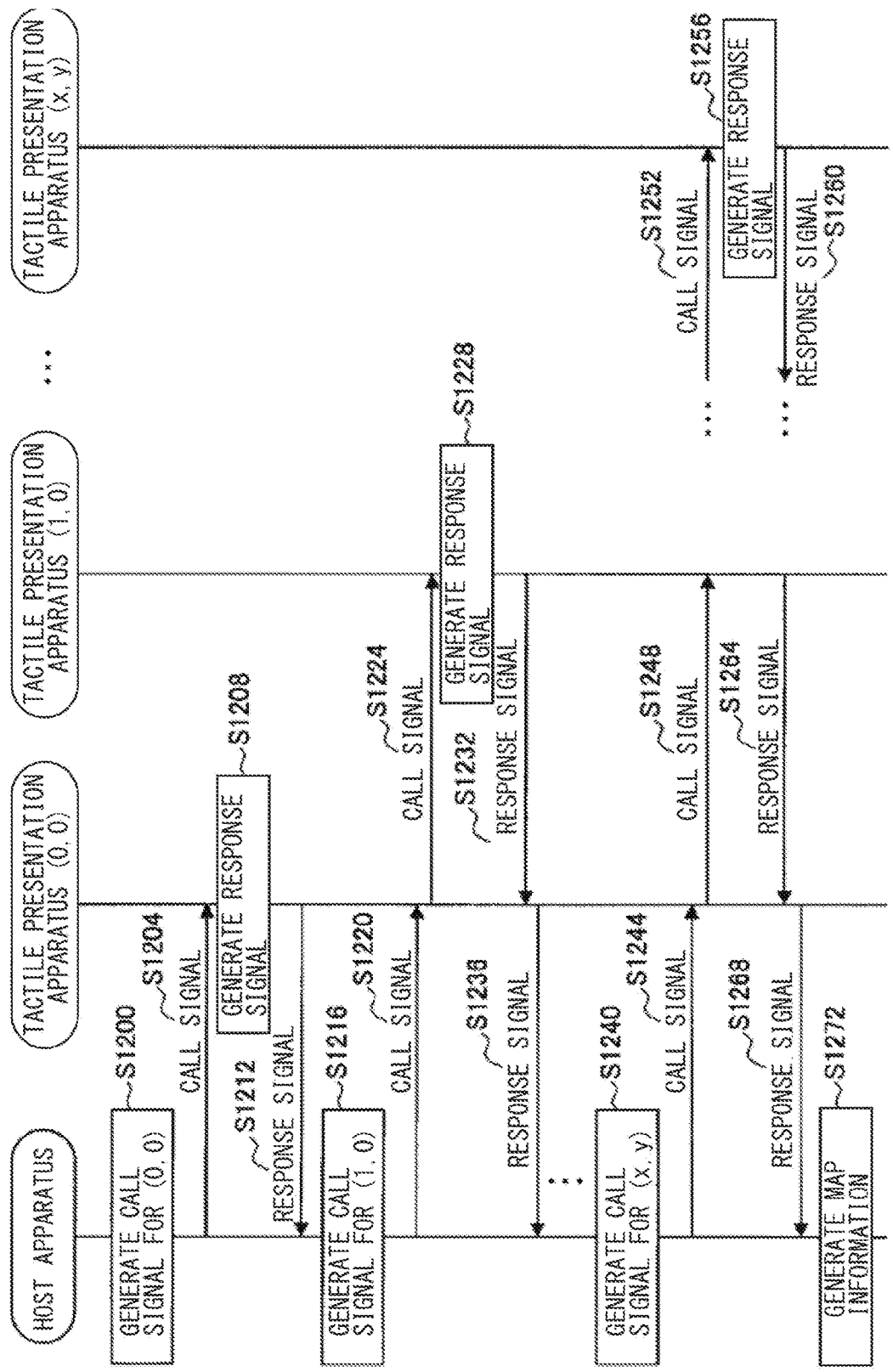
[FIG. 14]

[FIG. 15]
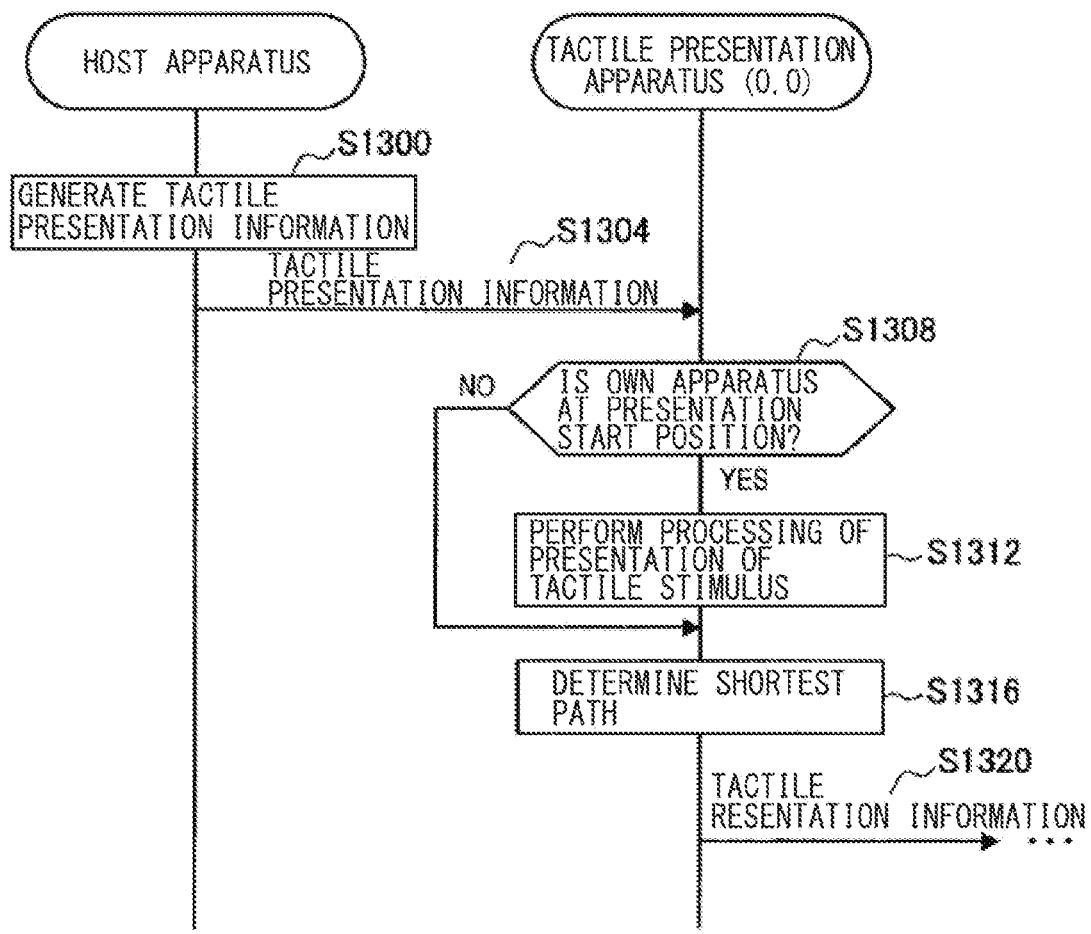

[FIG. 17]
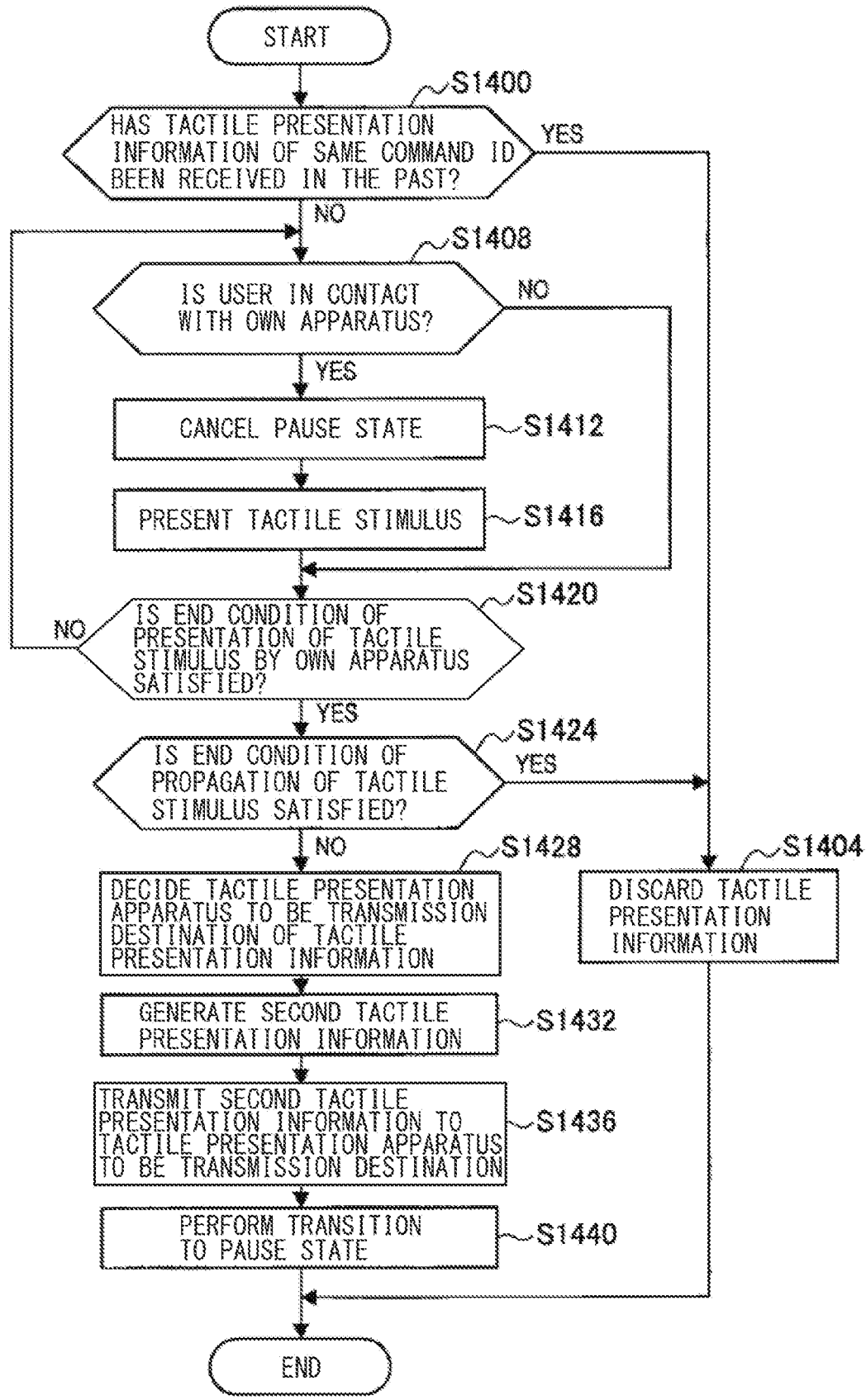

[FIG. 18]
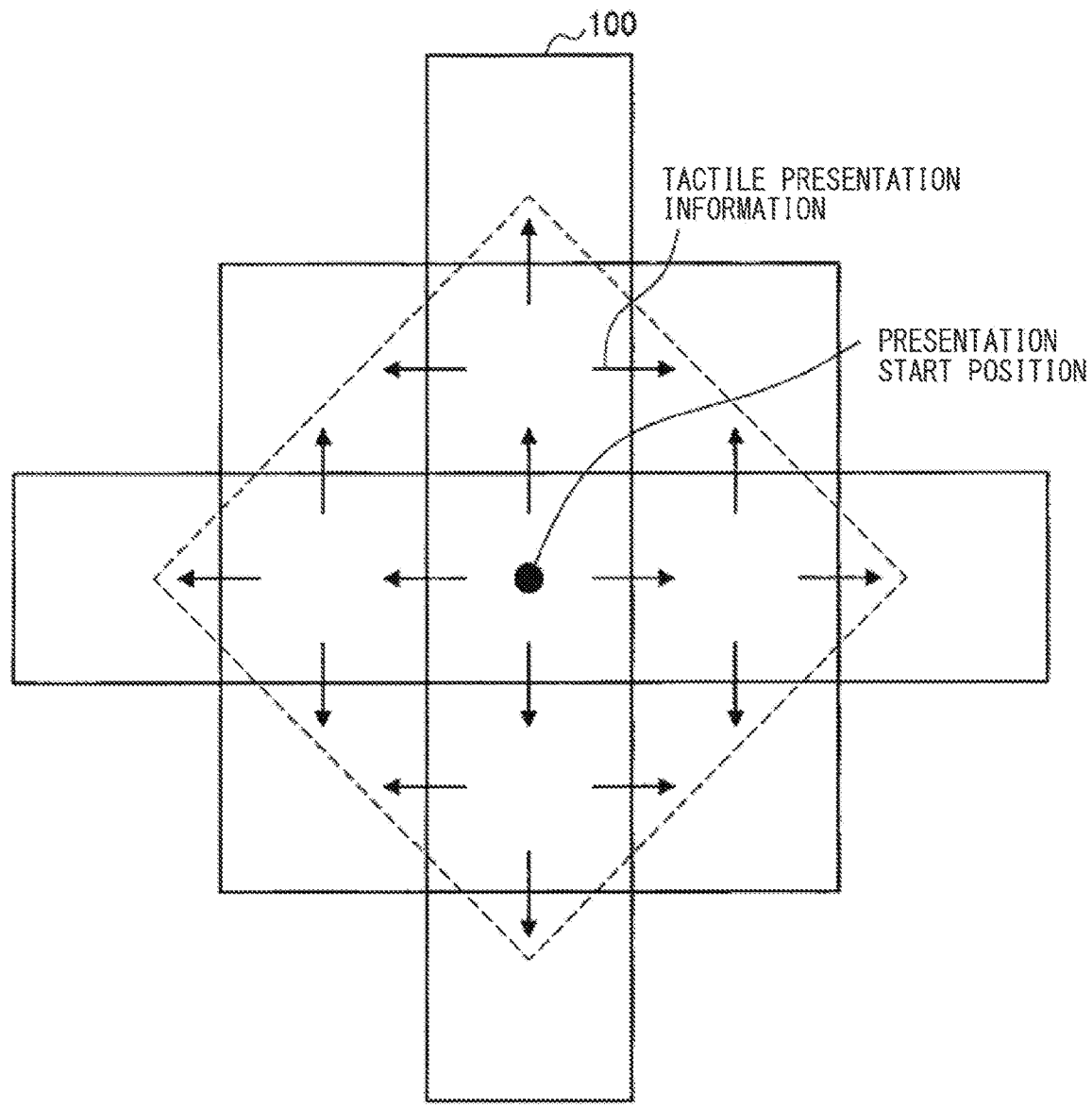

[FIG. 19]
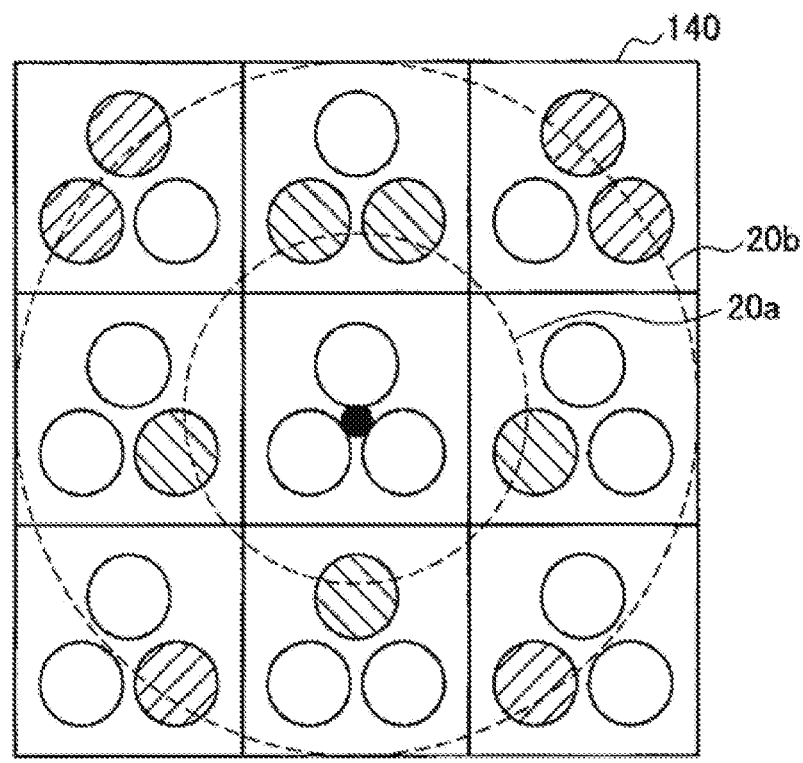
 ACTUATOR TO BE USED FOR PRESENTATION OF PROPAGATED TACTILE STIMULUS 20a
 ACTUATOR TO BE USED FOR PRESENTATION OF PROPAGATED TACTILE STIMULUS 20b

[FIG. 20]
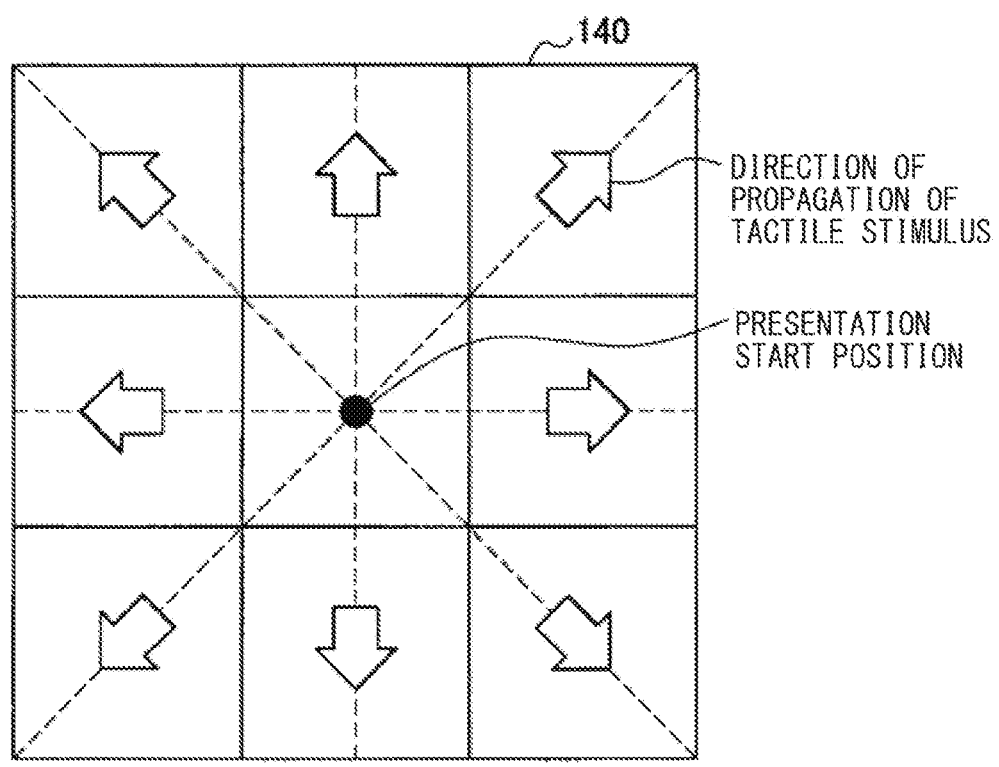

[FIG. 21]
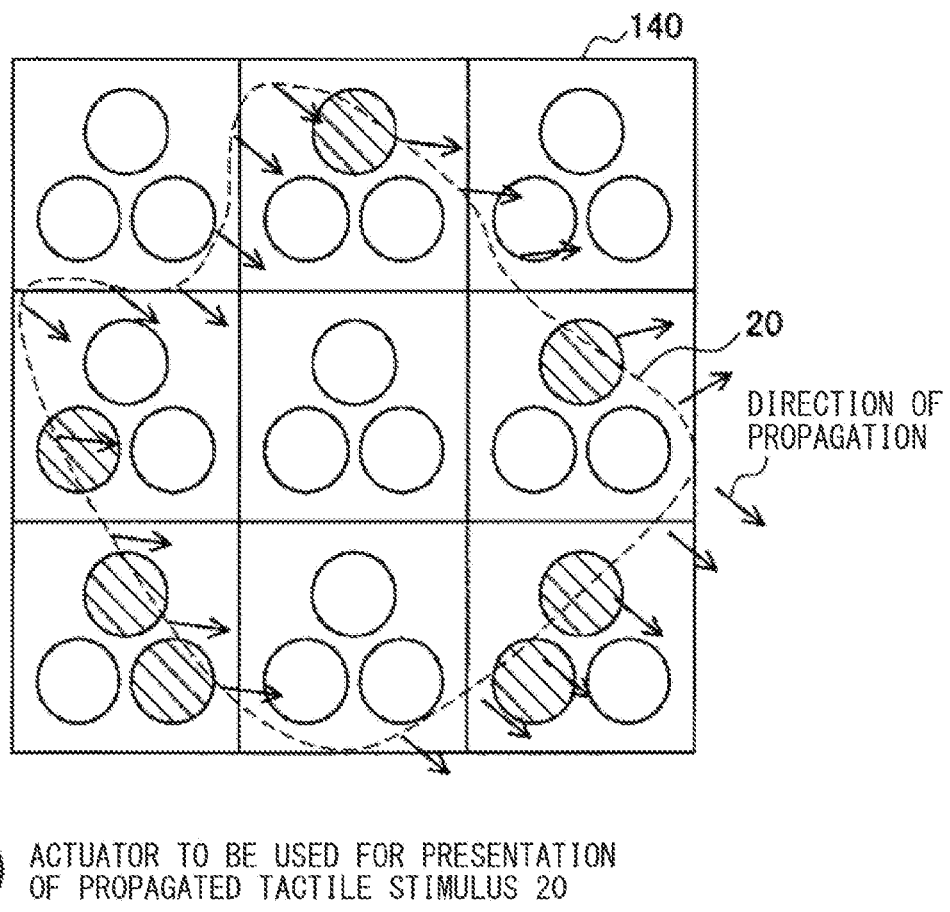

[FIG. 23]
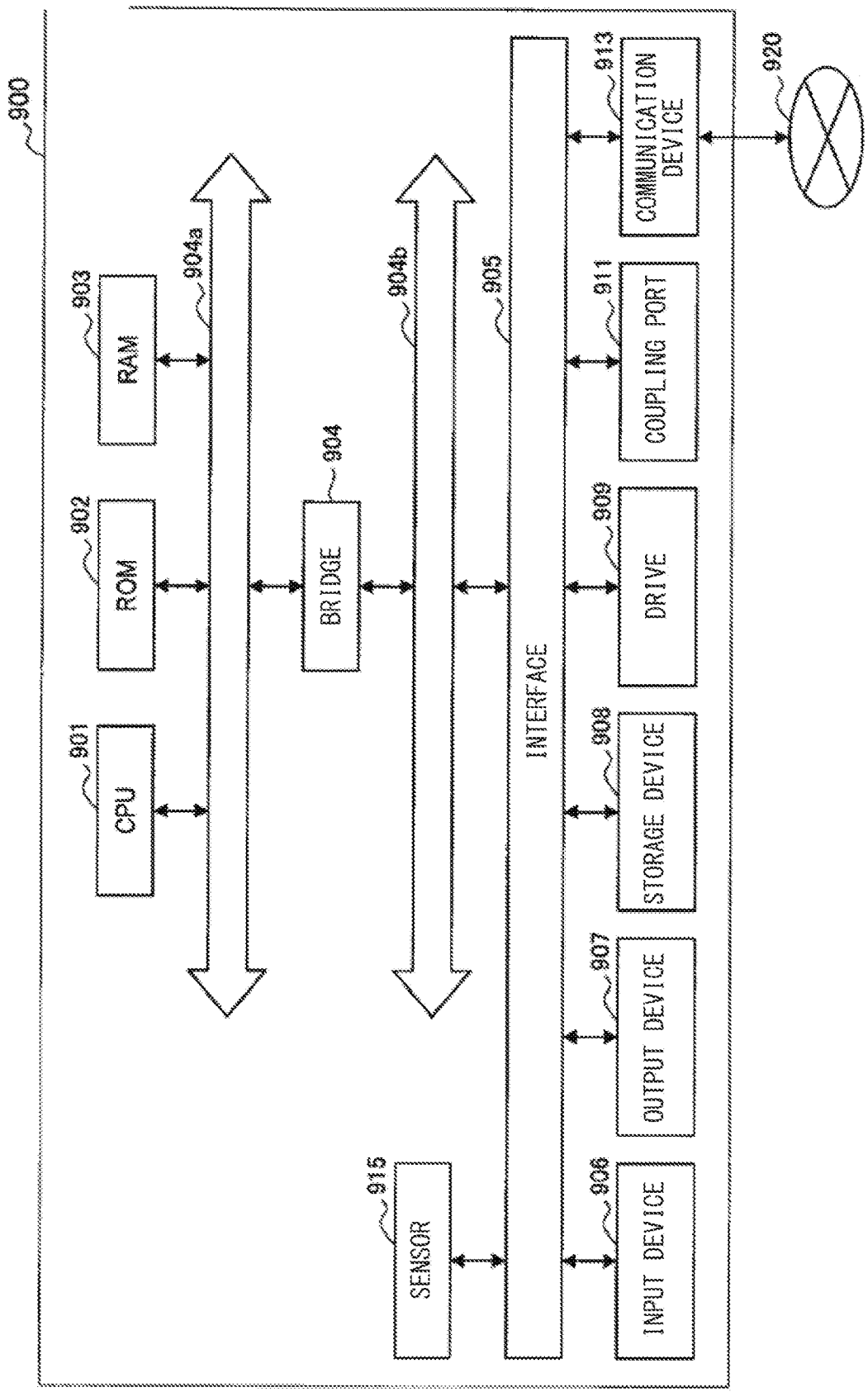

INFORMATION PROCESSING SYSTEM, TACTILE PRESENTATION APPARATUS, TACTILE PRESENTATION METHOD, AND STORAGE MEDIUM

CROSS REFERENCE TO RELATED APPLICATIONS

This application is a U.S. National Phase of International Patent Application No. PCT/JP2019/041594 filed on Oct. 24, 2019, which claims priority benefit of Japanese Patent Application No. JP 2018-213997 filed in the Japan Patent Office on Nov. 14, 2018. Each of the above-referenced applications is hereby incorporated herein by reference in its entirety.

TECHNICAL FIELD

The present disclosure relates to an information processing system, a tactile presentation apparatus, a tactile presentation method, and a storage medium.

BACKGROUND ART

There have been heretofore proposed various techniques for presenting a tactile stimulus such as a vibration to a user. For example, PTL 1 listed below discloses a technique of presenting a tactile stimulus to a user using tactile stimulus units arranged in a jacket worn by a user.

CITATION LIST

Patent Literature

PTL 1: International Publication No. WO2018/008217

SUMMARY OF THE INVENTION

Problem to be Solved by the Invention

However, according to the technique, etc. disclosed in PTL 1, a host apparatus that controls a plurality of tactile presentation apparatuses involves a high processing load. For example, in an example of PTL 1, a server (corresponding to a host apparatus) that controls a plurality of tactile stimulus units (corresponding to tactile presentation apparatuses) involves a high processing load. More specifically, it is necessary for the server to calculate intensity, a timing, or the like of a tactile stimulus for each tactile stimulus unit to generate and provide tactile presentation information used to present the tactile stimulus. In particular, in a case where there are a large number of tactile stimulus units, the server involves a higher processing load, which may possibly cause a delay in the processing.

Therefore, the present disclosure has been made in view of the above-described circumstances, and provides an information processing system, a tactile presentation apparatus, a tactile presentation method, and a storage medium that are novel and improved and that make it possible to present a tactile stimulus more appropriately using a plurality of tactile presentation apparatuses.

Means for Solving the Problem

According to the present disclosure, there is provided an information processing system including: an information processor; and a plurality of tactile presentation apparatuses, the plurality of tactile presentation apparatuses including a first tactile presentation apparatus that, in a case of receiving tactile presentation information from the information processor, transmits the tactile presentation information to a peripheral tactile presentation apparatus, and a second tactile presentation apparatus that, in a case of receiving the tactile presentation information from the peripheral tactile presentation apparatus, presents a tactile stimulus on a basis of the tactile presentation information.

In addition, according to the present disclosure, there is provided a tactile presentation apparatus including: a communication unit that receives tactile presentation information from a peripheral tactile presentation apparatus; and a tactile control section that controls presentation of a tactile stimulus on a basis of the tactile presentation information and controls providing of the tactile presentation information to another peripheral tactile presentation apparatus.

In addition, according to the present disclosure, there is provided a tactile presentation method executed by a computer, the method including: receiving tactile presentation information from a peripheral tactile presentation apparatus; and controlling presentation of a tactile stimulus on a basis of the tactile presentation information and controlling providing of the tactile presentation information to another peripheral tactile presentation apparatus.

In addition, according to the present disclosure, there is provided a storage medium storing a program that causes a computer to implement: receiving tactile presentation information from a peripheral tactile presentation apparatus; and controlling presentation of a tactile stimulus on a basis of the tactile presentation information and controlling providing of the tactile presentation information to another peripheral tactile presentation apparatus.

BRIEF DESCRIPTION OF THE DRAWINGS

FIG. 1 illustrates a specific example of a tactile presentation apparatus according to the present embodiment.

FIG. 2 illustrates a specific example of an arrangement of tactile presentation apparatuses according to the present embodiment.

FIG. 3 illustrates a specific example of a content provided by using the tactile presentation apparatuses according to the present embodiment.

FIGS. 4A, 4B, 4C, and 4D FIGS. 4A, 4B, 4C, and 4D are explanatory diagrams in which the tactile presentation apparatus according to the present embodiment controls presentation of a tactile stimulus depending on the way a user steps.

FIG. 5 is a block diagram illustrating a configuration example of an information processing system according to the present embodiment.

FIG. 6 is a block diagram illustrating a configuration example of the information processing system according to the present embodiment.

FIG. 7 is a block diagram illustrating a configuration example of a host apparatus according to the present embodiment.

FIG. 8 is a block diagram illustrating a configuration example (data format example) of tactile presentation information according to the present embodiment.

FIG. 9 is a block diagram illustrating a configuration example of the tactile presentation apparatus according to the present embodiment.

FIG. 10 is a flowchart illustrating a specific example of the entire processing to be performed upon providing a content.

FIG. 11 is a sequence diagram illustrating a specific example of processing related to an initial setting of the tactile presentation apparatus according to the present embodiment.

FIG. 12 is an explanatory diagram of a setting method of identification information on the tactile presentation apparatus according to the present embodiment.

FIG. 13 is an explanatory diagram of a setting method of the identification information on the tactile presentation apparatus according to the present embodiment.

FIG. 14 is a sequence diagram illustrating a specific example of processing of generating map information by the host apparatus according to the present embodiment.

FIG. 15 is a sequence diagram illustrating a specific example of processing of presentation of a tactile stimulus by the tactile presentation apparatus according to the present embodiment.

FIGS. 16A, 16B, and 16C FIGS. 16A, 160B, and 16C are explanatory diagrams of processing of presentation of a tactile stimulus to be propagated.

FIG. 17 is a flowchart illustrating a specific example of processing of presentation of a tactile stimulus by the tactile presentation apparatus according to the present embodiment.

FIG. 18 is an explanatory diagram of processing of presentation of a tactile stimulus based on a position of a configuration that presents a tactile stimulus.

FIG. 19 is an explanatory diagram of processing of presentation of a tactile stimulus based on a position of a configuration that presents a tactile stimulus.

FIG. 20 is an explanatory diagram of simplified processing of presentation of a tactile stimulus.

FIG. 21 is an explanatory diagram of processing of presentation of a tactile stimulus to be propagated in an arbitrary shape.

FIG. 23 is a block diagram illustrating a hardware configuration example of the tactile presentation apparatus or the host apparatus according to the present embodiment.

MODES FOR CARRYING OUT THE INVENTION

Figure 16A:
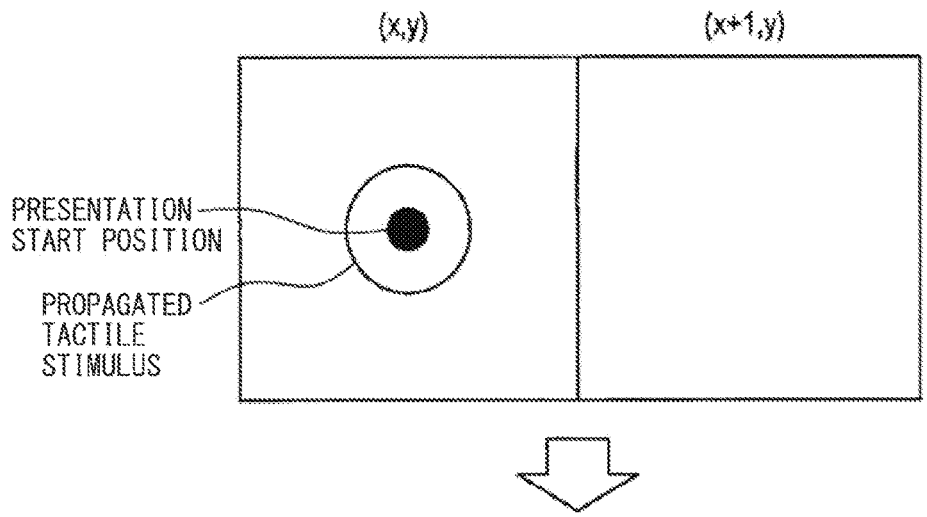

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

It is to be noted that the description is given in the following order.
1. Overview
2. Configuration Example of Each Apparatus
3. Example of Processing Flow of Each Apparatus
4. Modification Examples
5. Hardware Configuration Example
6. Conclusion 1. Overview First, description is given of an overview of an embodiment according to the present disclosure.
(1.1. Overview of Tactile Presentation Apparatus)
FIG. 1 illustrates a specific example of a tactile presentation apparatus 100 according to the present embodiment. The tactile presentation apparatus 100 includes a plurality of tactile presentation units 140 (a tactile presentation unit 140a to a tactile presentation unit 140i in the example of FIG. 1) that present tactile stimuli; controlling these tactile presentation units 140 enables presentation of a tactile stimulus to any target. It is to be noted that the number or arrangement of the tactile presentation units 140 included in the tactile presentation apparatus 100 is not particularly limited.

As used herein, the "tactile stimulus" presented by the tactile presentation unit 140 includes, for example, a vibration, but is not necessarily limited thereto, and may include, for example, a stimulus related to a temperature, a stimulus related to a force sense, an electric stimulus, or the like (i.e., a plurality of types of tactile stimuli may be presented). In the following, description is given mainly of a case where the tactile stimulus is a vibration. More specifically, as illustrated in FIG. 1, the tactile presentation unit 140 is provided with actuators 10 (an actuator 10a to an actuator 10c in the example of FIG. 1) near a surface thereof; vibrating the actuators 10 enables presentation of a vibration to any target. It is to be noted that the number or arrangement of the actuators 10 included in the tactile presentation unit 140 is not particularly limited. In addition, in a case where a tactile stimulus to be presented is other than a vibration, the tactile presentation units 140 is provided with a required configuration depending on the type of the tactile stimulus to be presented.

In the present embodiment, as illustrated in FIG. 2, a plurality of tactile presentation apparatuses 100 (a tactile presentation apparatus 100a to a tactile presentation apparatus 100i in the example of FIG. 2) are arranged on the ground in a state of close proximity to one another. This enables an information processing system according to the present embodiment to present a vibration to any target (e.g., a user) on these tactile presentation apparatuses 100. For example, suppose, as illustrated in FIG. 3, that an image of a "pond" is displayed on the plurality of tactile presentation apparatuses 100 (the tactile presentation apparatuses 100 may display the image on their own, or an external projector may project the image onto the tactile presentation apparatuses 100) and that a user u1 and a user u2 are on these tactile presentation apparatuses 100. Then, in a case where the user u1 walks in a region where the image of the pond is displayed, the tactile presentation apparatus 100 positioned at the foot of the user u1 (tactile presentation apparatus 100 in contact with the user u1) presents a vibration to the user u1 to thereby cause the user u1 to have perception of walking in the pond (active presentation of a tactile stimulus). Meanwhile, the tactile presentation apparatus 100 positioned at the foot of the user u2 (tactile presentation apparatus 100 in contact with the user u2) presents a vibration to the user u2 to thereby cause the user u2 to perceive an impact of a crash of a wave generated and propagated as a result of the user u1 walking in the pond (passive presentation of a tactile stimulus).

In addition, the tactile presentation units 140 may each include not only the actuator 10 but also a pressure-sensitive sensor. This enables the tactile presentation apparatus 100 to output not only whether or not a presentation target of the tactile stimulus is stepping on the tactile presentation apparatus 100, but also stepping force, a range or area to which the force is applied, and the like, thus making it possible to control the type, intensity, or the like of a vibration to be presented depending on results of these outputs. For example, as illustrated in FIGS. 4A, 4B, 4C, and 4D, when the user walks on a location from the tactile presentation unit 140a to the tactile presentation unit 140c, weight shift is assumed to be performed in the order of the heel (FIG. 4A), the rear of the sole (FIG. 4B), the front of the sole (FIG. 4C), and the toe (FIG. 4D). In this case, force (stepping force) applied to the tactile presentation units 140, a range or area to which the force is applied, and the like differ in each of FIGS. 4A, 4B, 4C, and 4D. Therefore, the tactile presentation apparatus 100 uses each of the tactile presentation units 140 (the tactile presentation unit 140a to the tactile presentation unit 140c in the case of FIGS. 4A, 4B, 4C, and 4D) depending on the stepping force, the range or area to which the force is applied, and the like to control the type, intensity, or the like of a vibration to be presented, thereby making it possible to achieve a variety of representations of tactile senses. For example, the tactile presentation apparatus 100 enables a user to have a perception of walking on sand or snow.

It is to be noted that the description is given above to the effect that the plurality of tactile presentation apparatuses 100 are placed on the ground in a state of close proximity to one another. It should be noted, however, that the phrase "in a state of close proximity to one another" refers to being positioned at a very close distance to one another, but does not necessarily mean being in contact with each other. In addition, the plurality of tactile presentation apparatuses 100 may not necessarily be arranged on the ground, but may be arranged in, for example, a wear worn by a user (no limitation is placed on the wear as a matter of course). In addition, the presentation target of a tactile stimulus is not particularly limited, and may be, for example, a user (human), an animal, or various objects (e.g., a robot, a vehicle, etc.). In the following, description is given by exemplifying a case where the user is the presentation target of the tactile stimulus.

(1.2. Configuration Example of Information Processing System)

FIG. 5 illustrates a configuration example of an information processing system according to the present embodiment. As illustrated in FIG. 5, the information processing system according to the present embodiment includes the plurality of tactile presentation apparatuses 100 described above, a host apparatus 200, and a content control apparatus 300

The content control apparatus 300 is an apparatus that controls the entire content provided by the information processing system according to the present embodiment. More specifically, the content control apparatus 300 decides the type, substance, and the like of the content to be provided to the user, and progresses the content. It is to be noted that the "content" includes, but not necessarily limited to, an experience-based attraction, a game, a concert, a play, or the like, for example. As illustrated in FIG. 5, the content control apparatus 300 is coupled for communication to the host apparatus 200, and transmits information concerning a progression status of the content to the host apparatus 200 when deciding the type, substance, and the like of the content and progressing the content.

The host apparatus 200 is an apparatus (information processor) that controls providing of a tactile stimulus by the tactile presentation apparatus 100 as the content progresses. More specifically, the host apparatus 200 receives information concerning the progression status of the content from the content control apparatus 300, and generates tactile presentation information used for the providing of the tactile stimulus by the tactile presentation apparatus 100 on the basis of the information. As illustrated in FIG. 5, the host apparatus 200 is coupled for communication to at least one of the plurality of tactile presentation apparatuses 100, and transmits the generated tactile presentation information to the tactile presentation apparatus 100. The host apparatus 200 continues the generation of the tactile presentation information and the transmission thereof to the tactile presentation apparatus 100 until the end of the content.

The tactile presentation apparatus 100 is an apparatus that presents a tactile stimulus to any target. More specifically, the plurality of tactile presentation apparatuses 100 are arranged on the ground in a state of close proximity to one another as described above, and present tactile stimuli to any target thereon (e.g., a user, etc.) on the basis of the tactile presentation information transmitted from the host apparatus 200.

Here, the plurality of tactile presentation apparatuses 100 includes a first tactile presentation apparatus that, in a case of receiving tactile presentation information from the host apparatus 200 (information processor), transmits the tactile presentation information to a peripheral tactile presentation apparatus 100, and a second tactile presentation apparatus that, in a case of receiving the tactile presentation information from the peripheral tactile presentation apparatus 100, presents a tactile stimulus on the basis of the tactile presentation information.

The first tactile presentation apparatus is the tactile presentation apparatus 100 (tactile presentation apparatus 100a in the example of FIG. 5) coupled for communication to the host apparatus 200 among the plurality of tactile presentation apparatuses 100, and transmits information (e.g., tactile presentation information) received from the host apparatus 200 to other tactile presentation apparatuses 100 to thereby diffuse the information among the plurality of tactile presentation apparatuses 100. That is, the first tactile presentation apparatus serves as a starting point when the information transmitted from the host apparatus 200 is diffused among the plurality of tactile presentation apparatuses 100. In addition, the first tactile presentation apparatus transmits information received from another tactile presentation apparatus 100 to the host apparatus 200.

The second tactile presentation apparatus is the tactile presentation apparatus 100 that presents a tactile stimulus to any target on the basis of the tactile presentation information diffused among the plurality of tactile presentation apparatuses 100. More specifically, a plurality of second tactile presentation apparatuses exist in the system, and present a tactile stimulus in conjunction with one another on the basis of the tactile presentation information to thereby present a tactile stimulus to be propagated to a presentation target of the tactile stimulus. It is to be noted that each of the tactile presentation apparatuses 100 may function as the first tactile presentation apparatus, may function as the second tactile presentation apparatus, or may function as both of the first tactile presentation apparatus and the second tactile presentation apparatus. In the example of FIG. 5, all of the tactile presentation apparatuses 100 (tactile presentation apparatuses 100a to tactile presentation apparatus 100f) may function as the second tactile presentation apparatus.

In this manner, on the basis of the tactile presentation information diffused from the first tactile presentation apparatus as the starting point, the second tactile presentation apparatus presents the tactile stimulus, thereby reducing a processing load of the host apparatus 200. For example, it becomes unnecessary for the host apparatus 200 to individually generate and transmit the tactile presentation information to the tactile presentation apparatus 100 (second tactile presentation apparatus) that presents the tactile stimulus.

It is to be noted that the configuration illustrated in FIG. 5 is merely an example, and the configuration example of the information processing system according to the present embodiment is not necessarily limited to the example of FIG. 5. For example, the host apparatus 200 and the content control apparatus 300 may be achieved by a single apparatus. In addition, as illustrated in FIG. 6, the host apparatus 200 may be coupled for communication to the plurality of tactile presentation apparatuses 100 (tactile presentation apparatus 100a to tactile presentation apparatus 100f). In the case of FIG. 6, the tactile presentation apparatuses 100 (tactile presentation apparatus 100a to tactile presentation apparatus 100f) coupled for communication to the host apparatus 200 may each function as the first tactile presentation apparatus. In this manner, the plurality of tactile presentation apparatuses 100 may each function as the first tactile presentation apparatus, thereby enabling the host apparatus 200 to select an optimum tactile presentation apparatus 100 as the first tactile presentation apparatus.

2. Configuration Example of Each Apparatus

The description has been given above of an overview of the present embodiment. Subsequently, description is given of a configuration example of each apparatus according to the present embodiment.
(2.1. Configuration Example of Host Apparatus 200)
First, description is given, with reference to FIG. 7, of a configuration example of the host apparatus 200. FIG. 7 is a block diagram illustrating the configuration example of the host apparatus 200. As illustrated in FIG. 7, the host apparatus 200 includes a control unit 210, a communication unit 220, and a storage unit 230. In addition, the control unit 210 includes an initial setting section 211, a map generation section 212, a tactile control section 213, and an output control section 214.

The control unit 210 is configured to collectively control overall processing to be performed by the host apparatus 200. For example, the control unit 210 is able to control activation and stop of each configuration. It is to be noted that the substance of the control by the control unit 210 is not particularly limited. For example, the control unit 210 may control processing (e.g., processing related to an OS (Operating System), etc.) typically performed in various servers, general-purpose computers, PCs (Personal Computer), tablet PCs, or the like.

The initial setting section 211 is configured to control processing related to an initial setting to be performed before the presentation of a tactile stimulus. More specifically, the initial setting section 211 generates an instruction signal for the initial setting before the start of the content or upon the activation of the information processing system, and controls the communication unit 220 to thereby transmit the instruction signal to the first tactile presentation apparatus. The initial setting includes, for example, a setting of identification information by which each tactile presentation apparatus 100 identifies an own apparatus. The processing related to the initial setting is described in detail in later sections.

The map generation section 212 is configured to generate map information indicating a positional relationship among the plurality of tactile presentation apparatuses 100. More specifically, after the end of the initial setting, the map generation section 212 generates a call signal for map generation, and controls the communication unit 220 to thereby transfer the call signal to the first tactile presentation apparatus. When receiving a response signal from each tactile presentation apparatus 100 responding to the call signal, the map generation section 212 generates map information on the basis of identification information on each tactile presentation apparatus 100 included in the response signal. The map information is described in detail in later sections.

The tactile control section 213 is configured to control processing of presentations of tactile stimuli by the plurality of tactile presentation apparatuses 100. More specifically, the tactile control section 213 generates tactile presentation information to be used for providing of a tactile stimulus by the tactile presentation apparatus 100 on the basis of information concerning a progression status of a content provided from the content control apparatus 300, and controls the communication unit 220 to thereby transmit the tactile presentation information to the first tactile presentation apparatus.

Description is given here, with reference to FIG. 8, of a configuration example (data format example) of the tactile presentation information. FIG. 8 illustrates a configuration example of the tactile presentation information. As illustrated in FIG. 8, the tactile presentation information includes a device ID, a command ID, and data. The device ID stores identification information on the tactile presentation apparatus 100 to present a tactile stimulus on the basis of the tactile presentation information. The device ID enables each tactile presentation apparatus 100 to appropriately determine whether or not to present a tactile stimulus on the basis of the received tactile presentation information. The command ID stores identification information allowing for identification of the tactile presentation information. The command ID prevents a tactile stimulus from being presented in an overlapping manner on the basis of the same tactile presentation information. More specifically, when the tactile presentation information is diffused among the plurality of tactile presentation apparatuses 100, the same tactile presentation information may be received by the same tactile presentation apparatus 100 via different paths in some cases. At this time, in a case of determining to have received the same tactile presentation information in the past and to have presented a tactile stimulus on the basis of the command ID, the tactile presentation apparatus 100 is able to decide not to present the tactile stimulus using this tactile presentation information. In addition, the data stores, as a detail of the tactile stimulus, for example, waveform information to be used for presenting a vibration or a force sense, and information concerning intensity of the tactile stimulus, a propagation speed of the tactile stimulus, a propagation mode of the tactile stimulus (e.g., modes of spread or attenuation of the tactile stimulus, etc.), a presentation condition of the tactile stimulus (output condition), an end condition of propagation of the tactile stimulus, or the like. It is to be noted that, in a case where several types of waveform information are stored in advance in each tactile presentation apparatus 100, information allowing for specifying of waveform information, etc. may be stored in a data part in the tactile presentation information. This allows for reduction in a data amount of the tactile presentation information. The configuration example of the tactile presentation information is not necessarily limited to the example of FIG. 8.

The tactile control section 213 is configured to generate the tactile presentation information used for presentation of the tactile stimulus by the tactile presentation apparatus 100 existing at a presentation start position. Thereafter, in a case where another tactile presentation apparatus 100 presents a tactile stimulus to be propagated, another tactile presentation information generated on the basis of the tactile presentation information generated by the tactile control section 213 (or tactile presentation information generated by changing the tactile presentation information generated by the tactile control section 213) is used. The processing related to the propagation of the tactile stimulus is described in detail in later sections. The tactile control section 213 controls the communication unit 220 to thereby transmit the tactile presentation information to the first tactile presentation apparatus.

The output control section 214 is configured to control processing related to various outputs (outputs other than a tactile stimulus) by the plurality of tactile presentation apparatuses 100. In addition to the tactile stimulus, the tactile presentation apparatus 100 is able to perform, for example, image display, acoustic output, and the like (not limited thereto). Therefore, the output control section 214 generates control information to be used for various outputs by the tactile presentation apparatus 100 on the basis of the information concerning the progression status of the content provided from the content control apparatus 300, and controls the communication unit 220 to thereby transmit the control information to the first tactile presentation apparatus.

The communication unit 220 is configured to communicate with the content control apparatus 300 and the first tactile presentation apparatus. The communication unit 220 wirelessly communicates with these apparatuses directly or via a network access point in a system such as a wired LAN (Local Area Network), a wireless LAN, Wi-Fi (Wireless Fidelity, registered trademark), infrared communication, Bluetooth (registered trademark), or near field/contactless communication, for example.

The storage unit 230 is configured to store various types of information. For example, the storage unit 230 stores programs, parameters, or the like to be used by the control unit 210 or the communication unit 220. In addition, the storage unit 230 may store results of the processing by the control unit 210, information received from an external apparatus by the communication unit 220, and the like. It is to be noted that the substance of the information stored by the storage unit 230 is not limited thereto.

The description has been given above of the configuration example of the host apparatus 200. It is to be noted that the configuration described above with reference to FIG. 7 is merely an example, and the configuration of the host apparatus 200 is not limited to such an example. For example, the host apparatus 200 may not include some of the configurations illustrated in FIG. 7, or may include a configuration not illustrated in FIG. 7. In addition, the configuration illustrated in FIG. 7 may be provided in an external apparatus (unillustrated), and the host apparatus 200 may implement each of the functions described above by linking for communication to the external apparatus.

(2.2. Configuration Example of Tactile Presentation Apparatus 100)

Subsequently, description is given, with reference to FIG. 9, of a configuration example of the tactile presentation apparatus 100. FIG. 9 is a block diagram illustrating a configuration example of the tactile presentation apparatus 100. As illustrated in FIG. 9, the tactile presentation apparatus 100 includes a control unit 110, a communication unit 120, a sensor unit 130, the tactile presentation unit 140, an output unit 150, and a storage unit 160. In addition, the control unit 110 includes an initial setting section 111, a tactile control section 112, and an output control section 113. It is to be noted that either in a case of functioning as the first tactile presentation apparatus or in a case of functioning as the second tactile presentation apparatus, the tactile presentation apparatus 100 may have a similar configuration (configuration of FIG. 9). It should be noted that, unless otherwise specifically noted, subject matters described hereinafter apply to both of the first tactile presentation apparatus and the second tactile presentation apparatus.

The control unit 110 is configured to collectively control overall processing to be performed by the tactile presentation apparatus 100. For example, the control unit 110 is able to control activation and stop of each configuration. It is to be noted that the substance of the control by the control unit 110 is not particularly limited. For example, the control unit 110 may control processing (e.g., processing related to an OS) typically performed in various servers, general-purpose computers, PCs, tablet PCs, or the like.

The initial setting section 111 is configured to perform an initial setting on the basis of a control by the host apparatus 200. More specifically, the initial setting section 111 sets identification information for identification of an own apparatus by using, as a trigger, a predetermined instruction signal transmitted from the host apparatus 200. Specific examples of the setting method of the identification information are described later. In addition, the initial setting section 111 may set an attribute that decides propagation characteristics of the tactile stimulus as the initial setting. Here, the "attribute" may be, for example, information indicating an object (material) reproduced by the tactile presentation apparatus 100, such as "rock", "stone", "wood", or "iron". For example, in a case where an image representing an environment is displayed by the output unit 150 or projected onto the tactile presentation apparatus 100 by an external projector, the attribute of each tactile presentation apparatus 100 may be decided by a display substance, a projection substance, or the like (more specifically, the attribute of the tactile presentation apparatus 100 displaying a "rock" image is the "rock", etc.). The initial setting section 111 determines the attribute on the basis of the information (control information to be used for image display, etc.) provided by the host apparatus 200. It is to be noted that the substance of the attribute is not limited to the above-described example. For example, the attribute may be information on numeric values indicating propagation characteristics of the tactile stimulus (e.g., hardness, thermal conductivity, etc.). In addition, the attribute may be set in a unit of the tactile presentation apparatus 100, in a unit of the tactile presentation unit 140 or in a unit of the actuator 10, or may alternatively be set in a unit of region of the tactile presentation apparatus 100 (e.g., the attribute of "rock" is set in an upper half region of a tactile stimulus presentation position).

The tactile control section 112 is configured to present the tactile stimulus to any target on the basis of the tactile presentation information. More specifically, in a case where the tactile presentation information generated by the host apparatus 200 is provided to the first tactile presentation apparatus, the tactile control section 112 of the first tactile presentation apparatus determines whether or not presentation of the tactile stimulus by an own apparatus is necessary on the basis of the device ID included in the tactile presentation information. Then, in a case where determination is made that the presentation of the tactile stimulus by the own apparatus is necessary, the tactile control section 112 controls the tactile presentation unit 140 on the basis of the tactile presentation information to thereby present the tactile stimulus.

In a case where determination is made that the presentation of the tactile stimulus by the own apparatus is not necessary, the tactile control section 112 of the first tactile presentation apparatus transmits the tactile presentation information to another peripheral tactile presentation apparatus 100 without presenting the tactile stimulus. In this manner, the tactile presentation information is linked for communication up to the tactile presentation apparatus 100 existing at a presentation start position via one or the plurality of tactile presentation apparatuses 100, and the tactile control section 112 of the tactile presentation apparatus 100 existing at the presentation start position controls the tactile presentation unit 140 on the basis of the tactile presentation information to thereby present the tactile stimulus.

Thereafter, the tactile stimulus is propagated. To describe the way a tactile stimulus is propagated, in a case of receiving the tactile presentation information from the peripheral tactile presentation apparatus 100, the tactile presentation apparatus 100 (second tactile presentation apparatus) presenting the tactile stimulus presents a tactile stimulus on the basis of this tactile presentation information, and further transmits the tactile presentation information to another peripheral tactile presentation apparatus 100 (a tactile presentation apparatus 100 other than the tactile presentation apparatus 100 having transmitted the tactile presentation information). More specifically, the tactile presentation apparatus 100 (second tactile presentation apparatus) presenting the tactile stimulus presents a tactile stimulus on the basis of tactile presentation information (referred to as "first tactile presentation information") received from the peripheral tactile presentation apparatus 100, and further transmits tactile presentation information (referred to as "second tactile presentation information") reflecting a change in the tactile stimulus due to propagation to another peripheral tactile presentation apparatus 100. For example, the tactile control section 112 generates the second tactile presentation information on the basis of the first tactile presentation information (or generates the second tactile presentation information by changing the first tactile presentation information) in consideration of the nature of a vibration that attenuates as being away from a vibration source. This allows for propagation of the tactile stimulus among the tactile presentation apparatuses 100. It is to be noted that the description has been given above to the effect that the first tactile presentation information is information for presentation for an own apparatus and the second tactile presentation information is information for presentation for another peripheral tactile presentation apparatus 100; however, for example, the first tactile presentation information may be information for presentation for the tactile presentation apparatus 100 as a transmission source, and the second tactile presentation information may be information for presentation for the own apparatus.

In addition, the tactile presentation apparatus 100 (second tactile presentation apparatus) may generate the second tactile presentation information on the basis of propagation characteristics of the tactile stimulus. For example, the tactile control section 112 may generate the second tactile presentation information on the basis of the attribute of the tactile presentation apparatus 100 set as the initial setting. This enables the tactile presentation apparatus 100 to present a tactile stimulus corresponding to the attribute thereof. In addition, the tactile presentation apparatus 100 (second tactile presentation apparatus) may perform a physical simulation to thereby generate the second tactile presentation information. For example, the tactile presentation apparatus 100 may be provided with a simulator that uses a physical engine to simulate laws of mechanics; various parameters related to a tactile stimulus to be propagated, an attribute of the tactile presentation apparatus 100, a content to be provided, or the like may be inputted to the simulator, thereby generating the second tactile presentation information. The processing by the tactile control section 112, including other subject matters, is described in detail in later sections.

The output control section 113 is configured to perform various outputs (outputs other than the tactile stimulus). To describe more specifically, control information generated by the host apparatus 200 is diffused among the tactile presentation apparatuses 100, and the output control section 113 of each of the tactile presentation apparatuses 100 determines whether or not an output by an own apparatus is necessary on the basis of information (e.g., information corresponding to the device ID in the tactile presentation information) included in the control information. Then, in a case where determination is made that the output by the own apparatus is necessary, the output control section 113 controls the output unit 150 on the basis of the control information to thereby perform various outputs. It is to be noted that, in a case where the tactile presentation apparatus 100 is able to perform a plurality of types of outputs (e.g., able to perform image display and acoustic output), the output control section 113 controls each of the outputs individually.

The communication unit 120 is configured to communicate with an external apparatus. More specifically, the communication unit 120 of the first tactile presentation apparatus communicates with the host apparatus 200 and another tactile presentation apparatus 100, and the tactile presentation apparatus 100 other than the first tactile presentation apparatus communicates with another tactile presentation apparatus 100. The communication unit 120 wirelessly communicates with these apparatuses directly or via a network access point in a system such as a wired LAN, a wireless LAN, Wi-Fi (registered trademark), infrared communication, Bluetooth (registered trademark), or near field/contactless communication, for example.

The sensor unit 130 is configured to acquire various types of sensor information. For example, providing the sensor unit 130 with a pressure-sensitive sensor enables the control unit 110 (such as the tactile control section 112) to output, on the basis of sensor information acquired by the pressure-sensitive sensor, whether or not a presentation target of the tactile stimulus is stepping on the tactile presentation apparatus 100, stepping force, a range or area to which the force is applied, etc., thus making it possible to control the type, intensity, or the like of the tactile stimulus to be presented depending on results of these outputs. It is to be noted the type of the sensor included in the sensor unit 130 is not particularly limited.

The tactile presentation unit 140 is configured to present the tactile stimulus on the basis of the control by the tactile control section 112. For example, the tactile presentation unit 140 may be an actuator (e.g., ERM (eccentric motor), LRA (linear resonant actuator), or VCM (voice coil motor), etc.) that presents a vibration, may be an electric element that presents a stimulus related to a force sense, or may be a temperature change element (e.g., a Peltier element, etc.) that presents a stimulus related to a temperature. It is to be noted that the type of the tactile stimulus to be presented by the tactile presentation units 140 is not particularly limited, as described above.

The output unit 150 is configured to perform various outputs on the basis of the control by the output control section 113. For example, the output unit 150 includes a display means such as a display to thereby be able to perform various image displays, and includes an acoustic output means such as a speaker to thereby be able to perform various acoustic outputs (e.g., sound effects, etc.). It is to be noted that the output means included in the output unit 150 is not limited thereto.

The storage unit 160 is configured to store various types of information. For example, the storage unit 160 stores programs, parameters, or the like to be used by each of the configurations of the tactile presentation apparatus 100. In addition, the storage unit 160 may store processing results of each of the configurations, information received from an external apparatus by the communication unit 120, and the like. It is to be noted that the substance of the information stored in the storage unit 160 is not limited thereto.

The description has been given above of the configuration example of the tactile presentation apparatus 100. It is to be noted that the above-described configuration described with reference to FIG. 9 is merely an example, and the configuration of the tactile presentation apparatus 100 is not limited to such an example. For example, the tactile presentation apparatus 100 may not include some of the configurations illustrated in FIG. 9, or may include a configuration not illustrated in FIG. 9. In addition, the configuration illustrated in FIG. 9 may be provided in an external apparatus (unillustrated), and the tactile presentation apparatus 100 may implement each of the functions described above by linking for communication to the external apparatus.

3. Example of Processing Flow of Each Apparatus

The description has been given above of the configuration example of each of the apparatuses according to the present embodiment. Subsequently, description is given of an example of a processing flow of each of the apparatuses according to the present embodiment.
(3.1. Example of Overall Processing Flow)

First, description is given, with reference to FIG. 10, of an example of a flow of the entire processing performed upon providing a content.

In step S1000 of FIG. 10, an initial setting of each tactile presentation apparatus 100 is performed upon activation, etc. of the information processing system. For example, a setting of identification information on each tactile presentation apparatus 100, a setting of an attribute for deciding propagation characteristics of a tactile stimulus, and the like are performed. In step S1004, map information is generated. More specifically, the host apparatus 200 generates map information indicating a positional relationship among a plurality of tactile presentation apparatuses 100. In step S1008, a content is provided on the basis of the generated map information. More specifically, each tactile presentation apparatus 100 presents a tactile stimulus to any target, and performs various outputs (e.g., image display and acoustic output, etc.). In the following, description is given in detail of each processing of step S1000 to step S1008.
(3.2. Example of Processing Flow of Initial Setting)

Subsequently, description is given, with reference to FIG. 11, of an example of a processing flow exhibiting the detail of processing (step S1000 of FIG. 10) related to an initial setting of each tactile presentation apparatus 100.

In step S1100 of FIG. 11, the initial setting section 211 of the host apparatus 200 generates an instruction signal for the initial setting. In step S1104, the initial setting section 211 controls the communication unit 220 to thereby transmit the instruction signal to the first tactile presentation apparatus (tactile presentation apparatus 100*a* in the example of FIG. 11).

In step S1108, the initial setting section 111 of the tactile presentation apparatus 100*a* performs an initial setting on the basis of the instruction signal. For example, the initial setting section 111 performs, as initial settings, a setting of identification information for identification of an own apparatus and a setting of an attribute for deciding propagation characteristics of a tactile stimulus. Thereafter, in step S1112, the initial setting section 111 of the tactile presentation apparatus 100*a* controls the communication unit 120 to thereby transmit the instruction signal to another peripheral tactile presentation apparatus 100 (tactile presentation apparatus 100*b* in the example of FIG. 11). In step S1116, the initial setting section 111 of the tactile presentation apparatus 100*b* performs an initial setting on the basis of the instruction signal. In this manner, the tactile control section 112 of each tactile presentation apparatus 100 executes the initial setting and transmits (diffuses) the instruction signal to thereby perform the initial setting of all of the tactile presentation apparatuses 100.

Description is given here, with reference to FIGS. 12 and 13, of a setting method of identification information on each tactile presentation apparatus 100.

The plurality of tactile presentation apparatuses 100 each calculate identification information on the basis of a mutual positional relationship. For example, as illustrated in FIG. 12, in a case where the tactile presentation apparatuses 100 are arranged in a grid pattern (grid pattern) shape, identification information on each of the tactile presentation apparatuses 100 may be represented by x-y coordinates. Upon receiving the instruction signal from the host apparatus 200, the initial setting section 111 of the first tactile presentation apparatus sets (x,y) (e.g., (0,0), etc.) as the identification information, and transmits the instruction signal to another peripheral tactile presentation apparatus 100.

Upon receiving the instruction signal from the peripheral tactile presentation apparatus 100, the initial setting section 111 of the tactile presentation apparatus 100 calculates the identification information on the basis of a positional relationship between an own apparatus and a tactile presentation apparatus 100 as a transmission source (hereinafter referred to as "transmission source apparatus") of the instruction signal. For example, as illustrated in FIG. 12, in a case where the own apparatus is positioned in an x-axis direction with respect to the transmission source apparatus, the initial setting section 111 calculates, as the identification information, a value obtained by adding one to the x-coordinate of the identification information on the transmission source apparatus (x+1). Conversely, in a case where the own apparatus is positioned in a direction opposite to the x-axis direction with respect to the transmission source apparatus, the initial setting section 111 calculates, as the identification information, a value obtained by subtracting one from the x-coordinate of the identification information on the transmission source apparatus (x−1). In addition, in a case where the own apparatus is positioned in a y-axis direction with respect to the transmission source apparatus, the initial setting section 111 calculates, as the identification information, a value obtained by adding one to a y-coordinate of the identification information on the transmission source apparatus (y+1). Conversely, in a case where the own apparatus is positioned in a direction opposite to the y-axis direction with respect to the transmission source apparatus, the initial setting section 111 calculates, as the identification information, a value obtained by subtracting one from the y-coordinate of the identification information on the transmission source apparatus (y−1). It is to be noted that the processing may be achieved by, for example, storing, in the instruction signal, the identification information set by the transmission source apparatus.

In this manner, calculating the identification information on the basis of the positional relationship between the own apparatus and the transmission source apparatus enables the initial setting section 111 to set unique identification information regardless of a route through which the instruction signal is diffused (regardless of the order of the tactile presentation apparatuses 100 to be routed). FIG. 12 exemplifies the case where the instruction signal is diffused in the x-axis direction (x+1) or in the y-axis direction (y+1). However, even when the instruction signal is diffused in the direction opposite to the x-axis direction (x−1) or in the direction opposite to the y-axis direction (y−1), it is possible to set unique identification information.

In addition, as illustrated in FIG. 13 for example, even in a case where an empty region is provided among the tactile presentation apparatuses 100, the initial setting section 111 of each of the tactile presentation apparatuses 100 is able to appropriately set the identification information. It is to be noted that the description has been given above by exemplifying the case where the tactile presentation apparatuses 100 are arranged in the grid pattern shape; however, the positional relationship among the tactile presentation apparatuses 100 is not limited thereto. For example, in a case where the tactile presentation apparatuses 100 are three-dimensionally arranged, the identification information on each of the tactile presentation apparatuses 100 may be represented by x-y-z coordinates.

(3.3. Example of Processing Flow related to Generation of Map information)

Subsequently, description is given, with reference to FIG. 14, of an example of a processing flow exhibiting the detail of processing of generating map information by the host apparatus 200 (step S1004 of FIG. 10).

In step S1200 of FIG. 14, the map generation section 212 of the host apparatus 200 generates a call signal for the tactile presentation apparatus 100 having certain identification information ((0,0) in the example of FIG. 14). It is to be noted that the call signal stores target identification information. In step S1204, the map generation section 212 controls the communication unit 220 to thereby transmit the call signal to the first tactile presentation apparatus (tactile presentation apparatus 100 having identification information (0,0) in the example of FIG. 14). In step S1208, the control unit 110 of the tactile presentation apparatus 100 having the identification information (0,0) generates a response signal to the call signal. In step S1212, the control unit 110 controls the communication unit 120 to thereby transmit the response signal to the host apparatus 200.

In step S1216, the map generation section 212 of the host apparatus 200 generates a call signal for the tactile presentation apparatus 100 having another identification information ((1,0) in the example of FIG. 14). In step S1220, the map generation section 212 controls the communication unit 220 to thereby transmit the call signal to the first tactile presentation apparatus. In step S1224, the control unit 110 of the first tactile presentation apparatus controls the communication unit 120 to thereby transmit the call signal to the tactile presentation apparatus 100 having the identification information (1,0). In step S1228, the control unit 110 of the tactile presentation apparatus 100 having the identification information (1,0) generates a response signal to the call signal. In step S1232, the control unit 110 controls the communication unit 120 to thereby transmit the response signal to the first tactile presentation apparatus. In step S1236, the control unit 110 of the first tactile presentation apparatus controls the communication unit 120 to thereby transmit the response signal to the host apparatus 200.

In this manner, each tactile presentation apparatus 100 mediates the communication between the tactile presentation apparatus 100, which is a call signal target, and the host apparatus 200 to thereby allow the host apparatus 200 to confirm presence/absence of a setting of each identification information. The processing from step S1240 to step S1268 of FIG. 14 allows for confirmation of presence/absence of a setting of the last identification information (x,y).

In step S1272, the map generation section 212 of the host apparatus 200 generates map information on the basis of the identification information set in each tactile presentation apparatus 100. As used herein, the map information refers to information indicating a positional relationship of each tactile presentation apparatus 100 on the basis of the identification information set in each tactile presentation apparatus 100. For example, in the example of FIG. 12 described above, map information is generated indicating that the tactile presentation apparatuses 100 (tactile presentation apparatus 100*a* to tactile presentation apparatus 100*i*) are arranged in a grid pattern shape with no empty region. In the example of FIG. 13, map information is generated indicating that the tactile presentation apparatuses 100 (tactile presentation apparatus 100*a* to tactile presentation apparatus 100*i*) are arranged in a grid pattern shape, with empty regions corresponding to identification information (x, y+1) and identification information (x+1, y+1).

(3.4. Example of Processing Flow Related to Presentation of Tactile Stimulus)

Subsequently, description is given, with reference to FIG. 15, of an example of a processing flow exhibiting the detail of processing of presentation of a tactile stimulus by the tactile presentation apparatus 100 (step S1008 of FIG. 10).

In step S1300 of FIG. 15, the tactile control section 213 of the host apparatus 200 generates tactile presentation information to be used for the providing of a tactile stimulus by the tactile presentation apparatus 100 on the basis of information concerning a progression status of the content provided from the content control apparatus 300. In step S1304, the tactile control section 213 controls the communication unit 220 to thereby transmit the tactile presentation information to the first tactile presentation apparatus (tactile presentation apparatus 100 having identification information (0,0) in the example of FIG. 15).

In step S1308, the tactile control section 112 of the first tactile presentation apparatus determines whether or not the own apparatus corresponds to the tactile presentation apparatus 100 at a presentation start position. In a case where the own apparatus is determined to correspond to the tactile presentation apparatus 100 at the presentation start position (step S1308/Yes), the tactile control section 112 performs processing of presentation of a tactile stimulus on the basis of the tactile presentation information in step S1312.

Meanwhile, in a case where the own apparatus is not determined to correspond to the tactile presentation apparatus 100 at the presentation start position (step S1308/No), the tactile control section 112 determines the shortest path to provide the tactile presentation information up to the tactile presentation apparatus 100 at the presentation start position in step S1316. Then, in step S1320, the tactile control section 213 controls the communication unit 220 to thereby transmit the tactile presentation information to the tactile presentation apparatus 100 positioned on the shortest path.

To describe the determination method of the shortest path in step S1316, for example, information on the "number of steps" is stored in the response signal in the processing of generating the map information described with reference to FIG. 14, and the tactile presentation apparatus 100 having mediated the response signal adds one to the number of steps. This enables the tactile presentation apparatus 100 having received the response signal to recognize the number of steps up to the tactile presentation apparatus 100, which is a transmission source of the response signal. Then, the tactile presentation apparatus 100 receives response signals having passed through a plurality of paths to thereby be able to recognize which of the peripheral tactile presentation apparatuses 100 is positioned on the shortest path up to the tactile presentation apparatus 100, which is the transmission source of the response signal. It is to be noted that the information on the "number of steps" may be stored in a signal other than the response signal in the processing of generating the map information.

Subsequently, description is given, with reference to FIGS. 16A, 16B, 16C, and 17, of processing of presentation of a tactile stimulus to be propagated after the tactile stimulus is presented at the presentation start position.

Figure 16B:
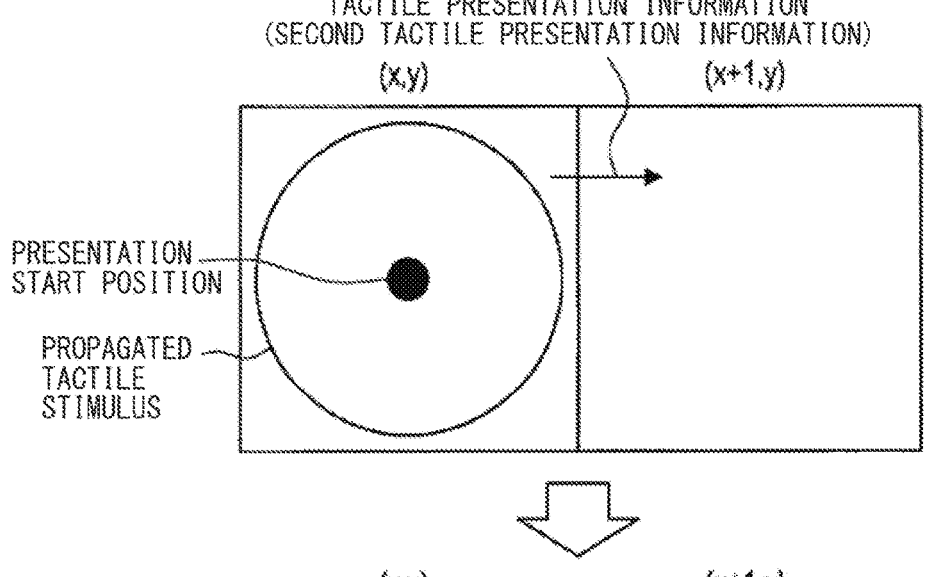
Figure 16C:
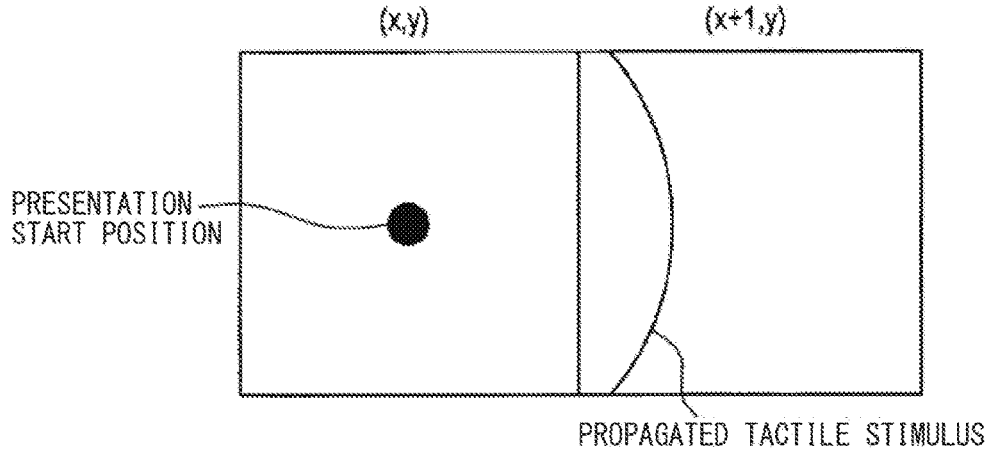

FIGS. 16A, 16B, and 16C are explanatory diagrams of processing of presentation of a tactile stimulus to be propagated. In FIGS. 16A, 16B, and 16C, a case is considered where a tactile stimulus is propagated from the tactile presentation apparatus 100 having identification information (x,y) (hereinafter referred to as a "tactile presentation apparatus 100$x$") to the tactile presentation apparatus 100 having identification information (x+1, y) (hereinafter referred to as a "tactile presentation apparatus 100$x$+1").

In FIG. 16A, the tactile presentation apparatus 100$x$ presents a tactile stimulus on the basis of tactile presentation information generated by the host apparatus 200. In FIG. 16B, in a case where determination is made that presentation of a tactile stimulus by the tactile presentation apparatus 100$x$+1 is necessary due to propagation of the tactile stimulus, the tactile presentation apparatus 100$x$ transmits the tactile presentation information to the tactile presentation apparatus 100$x$+1. At this time, as described above, the tactile presentation apparatus 100$x$ generates second tactile presentation information on the basis of the tactile presentation information (first tactile presentation information), and transmits the second tactile presentation information to the tactile presentation apparatus 100$x$+1. This allows, in FIG. 16C, the tactile presentation apparatus 100$x$+1 to present a tactile stimulus on the basis of the second tactile presentation information, thereby making it possible to represent the propagation of the tactile stimulus.

It is to be noted that a timing for the tactile presentation apparatus 100$x$ to generate the second tactile presentation information and a timing therefor to transmit the second tactile presentation information to the tactile presentation apparatus 100$x$+1 are not particularly limited. For example, immediately after receiving the tactile presentation information, the tactile presentation apparatus 100$x$ may determine whether or not the presentation of the tactile stimulus by the tactile presentation apparatus 100$x$+1 is necessary to perform the generation of the second tactile presentation information and the transmission thereof to the tactile presentation apparatus 100$x$+1.

Here, the tactile presentation apparatus 100 waits in a state where some of functions are stopped (hereinafter referred to as a "pause state") before or after the presentation of the tactile stimulus, in a case where the tactile presentation information is not received, or in a case where a presentation target of the tactile stimulus (a user, etc.) is not in contact with the own apparatus. This enables the tactile presentation apparatus 100 to reduce power consumption. It is to be noted that the substance of the function to be stopped in the pause state is not particularly limited. In addition, the tactile presentation apparatus 100 cancels the pause state immediately before the presentation of the tactile stimulus, in a case where the tactile presentation information is received, or in a case where the presentation target of the tactile stimulus is in contact with the own apparatus (e.g., in a case where a pressure-sensitive sensor detects the user having been on the own apparatus, etc.).

FIG. 17 is a flowchart illustrating a specific example of the processing of presentation of the tactile stimulus (step S1312 of FIG. 15). In step S1400, the tactile control section 112 of the tactile presentation apparatus 100 determines whether or not the tactile presentation information of the same command ID has been received in the past. In a case where determination is made that the tactile presentation information of the same command ID has been received in the past (step S1400/Yes), in step S1404, the tactile control section 112 discards the tactile presentation information. This prevents the same tactile stimulus from being presented in an overlapping manner using the same tactile presentation information.

When determination is made that the tactile presentation information of the same command ID has not been received in the past (step S1400/No), in step S1408, the tactile control section 112 determines whether or not the presentation target of the tactile stimulus (user) is in contact with the own apparatus. In a case where determination is made that the presentation target of the tactile stimulus is in contact with the own apparatus (step S1408/Yes), the tactile control section 112 cancels the pause state in step S1412, and presents the tactile stimulus on the basis of the tactile presentation information in step S1416. In a case where determination is made that the presentation target of the tactile stimulus is not in contact with the own apparatus (step S1408/No), no processing of step S1412 and step S1416 is performed.

In step S1420, the tactile control section 112 determines whether or not an end condition of the presentation of the tactile stimulus by the own apparatus is satisfied. In a case where determination is made that the end condition of the presentation of the tactile stimulus by the own apparatus is not satisfied (step S1420/No), the tactile control section 112 continues the processing from step S1408 to step S1416.

In a case where determination is made that the end condition of the presentation of the tactile stimulus by the own apparatus is satisfied (step S1420/Yes), in step S1424, the tactile control section 112 determines whether or not the end condition of propagation of the tactile stimulus is satisfied. For example, the tactile control section 112 determines whether or not a vibration is attenuated by the propagation to result in a vibration intensity of zero. In a case where determination is made that the end condition of the propagation of the tactile stimulus is satisfied (step S1424/Yes), in step S1404, the tactile control section 112 discards the tactile presentation information.

In a case where determination is made that the end condition of the propagation of the tactile stimulus is not satisfied (step S1424/No), in step S1428, the tactile control section 112 decides the tactile presentation apparatus 100, which is to be a transmission destination of the tactile presentation information (second tactile presentation information), from among other peripheral tactile presentation apparatuses 100. For example, the tactile control section 112 calculates the tactile presentation apparatus 100 to which the tactile stimulus is propagated. In step S1432, the tactile control section 112 generates the second tactile presentation information on the basis of the first tactile presentation information (tactile presentation information received from the peripheral tactile presentation apparatus 100 and used for the tactile stimulus of the own apparatus) in consideration of propagation characteristics of the tactile stimulus.

In step S1436, the tactile control section 112 controls the communication unit 120 to thereby transmit the second tactile presentation information to the tactile presentation apparatus 100 to be the transmission destination. In step S1440, the tactile control section 112 performs transition to the pause state, thereby ending a series of processing.

It is to be noted that, in the example of FIG. 17, the generation and the transmission of the second tactile presentation information are performed after the tactile presentation apparatus 100 ends the presentation of the tactile stimulus, but the timings of the generation and the transmission of the second tactile presentation information are not particularly limited as described above.

4. Modification Examples

The description has been given above of the example of the processing flow of each apparatus according to the present embodiment. Subsequently, description is given of modification examples according to the present embodiment.

(4.1. Presentation Control of Tactile Stimulus Based on Position of Configuration Presenting Tactile Stimulus)

First, description is given of presentation control of a tactile stimulus based on a position of a configuration that presents the tactile stimulus.

Suppose that the tactile presentation apparatuses 100 are arranged in a grid pattern shape and are coupled for communication to other tactile presentation apparatuses 100 neighboring vertically and horizontally. In this case, when each tactile presentation apparatus 100 transmits the tactile presentation information to other peripheral tactile presentation apparatuses 100, propagation in a vertical or horizontal direction is faster than propagation in an oblique direction as illustrated in FIG. 18. Accordingly, in a case where each tactile presentation apparatus 100 receives the tactile presentation information and sequentially presents a tactile stimulus, the tactile stimulus results in being propagated in a rhombic shape as illustrated in FIG. 18. This status is undesirable in a case where the tactile stimulus has characteristics of circular propagation (e.g., a vibration).

Therefore, the tactile presentation apparatus 100 (second tactile presentation apparatus) performs the generation of the second tactile presentation information or the transmission of the second tactile presentation information on the basis of the position of a configuration (actuator 10) that presents the tactile stimulus. For example, as illustrated in FIG. 19, upon presentation of a propagated tactile stimulus 20 (in the example of FIG. 19, a tactile stimulus 20a and a tactile stimulus 20b that are propagated), the generation of the second tactile presentation information or the transmission of the second tactile presentation information is performed to allow the actuator 10 existing at a position corresponding to the tactile stimulus 20 to be used. This enables the tactile presentation apparatus 100 to propagate the tactile stimulus in a circular shape.

It is to be noted that a tactile stimulus presentation method is not limited to the method described with reference to FIG. 19. For example, not only the actuator 10 existing at the position corresponding to the tactile stimulus 20, but also other actuators 10 may be used together to adjust intensity, etc. of the tactile stimulus presented by each actuator 10, thereby allowing the user to perceive that the tactile stimulus has been propagated in a circular shape.

Here, high accuracy may not be necessary for the propagation of the tactile stimulus in some cases. In addition, in a case where higher accuracy is necessary for the propagation of the tactile stimulus, a processing load of the tactile presentation apparatus 100 may be higher, thus resulting in possible occurrence of a processing delay, etc. Therefore, in the tactile presentation apparatus 100, the processing of presentation of the tactile stimulus may be simplified.

For example, instead of propagating the tactile stimulus in a circular shape as described above, the tactile presentation apparatus 100 may propagate the tactile stimulus in one direction in each of the plurality of tactile presentation units 140 provided in the tactile presentation apparatus 100. To describe more specifically with reference to FIG. 20, the tactile presentation apparatus 100 may employ, for example, a linear direction from a presentation start position toward a center position of each of the tactile presentation units 140, as a propagation direction of the tactile stimulus in each of the tactile presentation units 140. This enables the tactile presentation apparatus 100 to reduce the processing load while allowing the user to perceive the propagation direction of the tactile stimulus. It is to be noted that the method for simplifying the processing of presentation of the tactile stimulus is not limited to the example of FIG. 20.

(4.2. Presentation of Tactile Stimulus Propagated in Arbitrary Shape)

Subsequently, description is given of presentation of a tactile stimulus propagated in an arbitrary shape.

The description has been given above by exemplifying the circular propagation of the tactile stimulus, but the shape at the time when the tactile stimulus is propagated is not necessarily limited to the circular shape. More specifically, as illustrated in FIG. 21, the tactile stimulus may be propagated in a shape represented by a free curve (hereinafter referred to as a "free curve shape"). Also in this case, as illustrated in FIG. 21, the actuator 10 existing at a position corresponding to the propagated tactile stimulus 20 may be used for the presentation of the tactile stimulus.

Figure 22A:
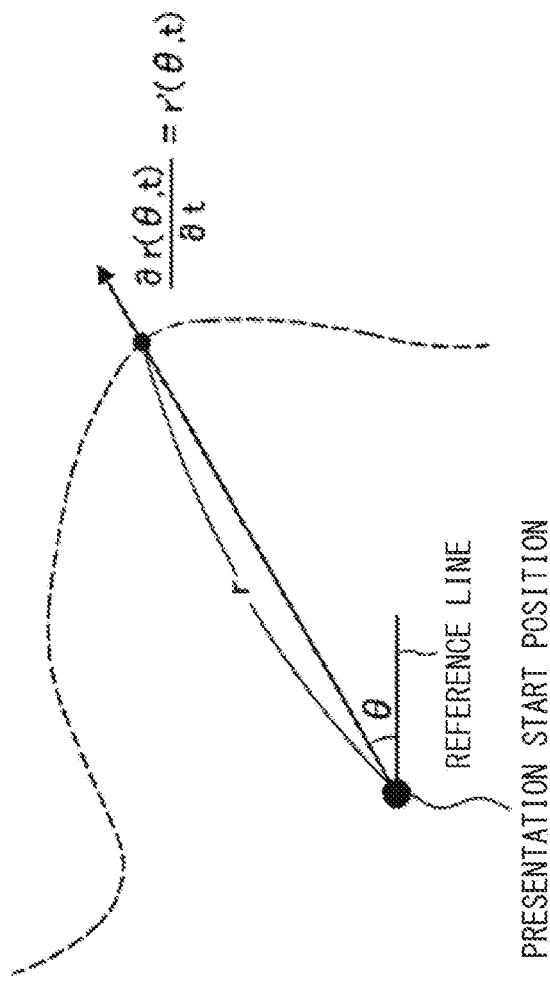
FIGS. 22A and 22B FIGS. 22A and 22B are explanatory diagrams of the processing of the presentation of a tactile stimulus to be propagated in an arbitrary shape.
Figure 22B:
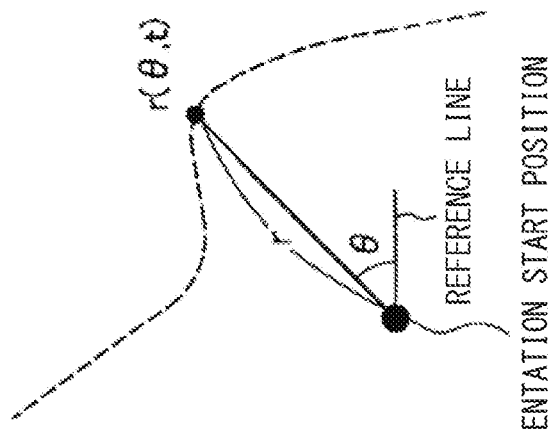

In a case where the tactile stimulus is propagated in a free curve shape, as illustrated in FIG. 22A, when a length of a line connecting a point on a free curve and a presentation start position is set as r, and an angle formed between the line and a predetermined reference line is set as $\theta$, the free curve shape at a certain time t is represented by $r(\theta,t)$. Then, as illustrated in FIG. 22B, when a result obtained by partial differentiation of the $r(\theta,t)$ by t is set as $r'(\theta,t)$, information concerning the $r(\theta,t)$ and the $r'(\theta,t)$ is stored in the tactile presentation information, thereby enabling each tactile presentation apparatus 100 to recognize the free curve shape and to present the tactile stimulus to be propagated in the free curve shape (it is to be noted that even in a case where the tactile stimulus is propagated in a shape other than the free curve shape, the achievement is possible in a similar manner).

5. Hardware Configuration Example

The description has been given above of the modification examples according to the present embodiment. Finally, description is given, with reference to FIG. 23, of a hardware configuration example of the tactile presentation apparatus 100 or the host apparatus 200 according to the present embodiment described above. FIG. 23 is a block diagram illustrating a hardware configuration example of an information apparatus 900 embodying the tactile presentation apparatus 100 or the host apparatus 200 according to the present embodiment. Information processing by the tactile presentation apparatus 100 or the host apparatus 200 according to the present embodiment is implemented by cooperation between software and hardware described below.

As illustrated in FIG. 23, the information apparatus 900 includes a CPU (Central Processing Unit) 901, a ROM (Read Only Memory) 902, a RAM (Random Access Memory) 903, and a host bus 904a. In addition, the information apparatus 900 includes a bridge 904, an external bus 904b, an interface 905, an input device 906, an output device 907, a storage device 908, a drive 909, a coupling port 911, a communication device 913, and a sensor 915. The information apparatus 900 may include, in place of or in addition to the CPU 901, a processing circuit such as a DSP or an ASIC.

The CPU 901 functions as an arithmetic processor and a controller, and controls overall operations in the information apparatus 900 in accordance with various programs. In addition, the CPU 901 may be a microprocessor. The ROM 902 stores programs to be used by the CPU 901, arithmetic parameters, and the like. The RAM 903 temporarily stores programs to be used in execution by the CPU 901, parameters appropriately changed in the execution, and the like. The CPU 901 may embody, for example, the control unit 110 of the tactile presentation apparatus 100 or the control unit 210 of the host apparatus 200.

The CPU 901, the ROM 902 and the RAM 903 are coupled mutually by the host bus 904a including a CPU bus, or the like. The host bus 904a is coupled to the external bus 904b such as a PCI (Peripheral Component Interconnect/Interface) bus via the bridge 904. It is to be noted that it is not necessarily required to configure the host bus 904a, the bridge 904, and the external bus 904b to be separated; these functions may be mounted in one bus.

The input device 906 may be implemented by, for example, a device to which information is inputted by a user, such as a mouse, a keyboard, a touch panel, a button, a microphone, a switch, and a lever. In addition, the input device 906 may be, for example, a remote control device utilizing infrared rays or other radio waves, or may be an externally coupled device such as a mobile phone or a PDA compatible with operations of the information apparatus 900. Further, the input device 906 may include, for example, an input control circuit that generates an input signal on the basis of information inputted by a user who uses the input means described above and outputs the generated input signal to the CPU 901. By operating this input device 906, the user of the information apparatus 900 is able to input various data to the information apparatus 900 or to give an instruction of a processing operation.

The output device 907 is formed by a device that is able to visually or auditorily notify the user of acquired information. Examples of such a device include a display device such as a CRT display device, a liquid crystal display device, a plasma display device, an EL display device, and a lamp, an acoustic output device such as a speaker and a headphone, and a printing device, etc. In addition, in the present embodiment, the output device 907 may be formed by an actuator that presents a vibration, an electric element that presents a stimulus related to a force sense, a temperature change element that presents a stimulus related to a temperature, or the like. The output device 907 may embody, for example, the tactile presentation unit 140 or the output unit 150 of the tactile presentation apparatus 100.

The storage device 908 is a device for storing data formed as an example of a storage unit of the information apparatus 900. The storage device 908 is implemented by, for example, a magnetic storage unit device such as an HDD, a semiconductor storage device, an optical storage device, a magneto-optical storage device, or the like. The storage device 908 may include a storage medium, a recorder that records data in the storage medium, a reader that reads the data from the storage medium, a deleting device that deletes the data recorded in the storage medium, and the like. The storage device 908 stores programs to be executed by the CPU 901, various data, various data acquired from the outside, and the like. The storage device 908 may embody, for example, the storage unit 160 of the tactile presentation apparatus 100 or the storage unit 230 of the host apparatus 200.

The drive 909 is a reader/writer for a storage medium, and is built in or externally attached to the information apparatus 900. The drive 909 reads information recorded in an attached removable storage medium such as a magnetic disk, an optical disk, a magneto-optical disk, or a semiconductor memory, and outputs the read information to the RAM 903. In addition, the drive 909 is also able to write information into the removable storage medium.

The coupling port 911 is an interface to be coupled to an external apparatus, and is a coupling port with an external apparatus that is able to transmit data by, for example, a USB (Universal Serial Bus), etc.

The communication device 913 is, for example, a communication interface formed by a communication device, etc. for coupling to a network 920. The communication device 913 is, for example, a communication card, etc. for wired or wireless LAN (Local Area Network), LTE (Long Term Evolution), Bluetooth (registered trademark), or WUSB (Wireless USB). In addition, the communication device 913 may be a router for optical communication, a router for ADSL (Asymmetric Digital Subscriber Line), a modem for various types of communication, or the like. The communication device 913 is able to transmit and receive signals or the like to and from the Internet or other communication apparatuses in accordance with a predetermined protocol such as TCP/IP, for example. The communication device 913 may embody, for example, the communication unit 120 of the tactile presentation apparatus 100 or the communication unit 220 of the host apparatus 200.

The sensor 915 is, for example, each of various sensors such as a pressure-sensitive sensor, an acceleration sensor, a gyro sensor, a geomagnetic sensor, an optical sensor, a sound sensor, or a distance measuring sensor. The sensor 915 acquires information concerning a status of the information apparatus 900 itself, such as a posture and a traveling speed of the information apparatus 900, as well as information concerning an ambient environment of the information apparatus 900, such as ambient brightness and noise of the information apparatus 900. In addition, the sensor 915 may include a GPS sensor that receives a GPS signal to measure latitude, longitude, and altitude of the apparatus. The sensor 915 may embody, for example, the sensor unit 130 of the tactile presentation apparatus 100.

It is to be noted that the network 920 is a wired or wireless transmission path for information transmitted from an apparatus coupled to the network 920. For example, the network 920 may include a public network such as the Internet, a telephone network, a satellite communication network, various types of LAN (Local Area Network) including Ethernet (registered trademark), WAN (Wide Area Network), and the like. In addition, the network 920 may include a private network such as IP-VPN (Internet Protocol-Virtual Private Network).

The description has been given above of the example of the hardware configuration that makes it possible to implement the functions of the information apparatus 900 according to the present embodiment. Each of the above-described components may be implemented using general-purpose members, or may be implemented by hardware specialized in the functions of the respective components. Accordingly, it is possible to appropriately change hardware configurations to be utilized in accordance with a technical level at the time of implementing the present embodiment.

It is to be noted that it is possible to create a computer program for implementing each function of the information apparatus 900 according to the present embodiment as described above and to mount the computer program on a PC, etc. In addition, it is also possible to provide a computer-readable recording medium in which such a computer program is stored. The recording medium is, for example, a magnetic disk, an optical disk, a magneto-optical disk, a flash memory, or the like. In addition, the computer program described above may be distributed via a network, for example, without using a recording medium.

6. Conclusion

As described above, the information processing system according to the present embodiment includes the host apparatus 200 and the plurality of tactile presentation apparatuses 100, and the plurality of tactile presentation apparatuses 100 includes the first tactile presentation apparatus that, in a case of receiving tactile presentation information from the host apparatus 200, transmits the tactile presentation information to the peripheral tactile presentation apparatus 100, and the second tactile presentation apparatus that, in a case of receiving the tactile presentation information from the peripheral tactile presentation apparatus 100, presents a tactile stimulus on the basis of the tactile presentation information. In this manner, the second tactile presentation apparatus presents the tactile stimulus on the basis of the tactile presentation information diffused from the first tactile presentation apparatus as a starting point, thereby reducing a processing load of the host apparatus 200. For example, it becomes unnecessary for the host apparatus 200 to individually generate and transmit the tactile presentation information to the tactile presentation apparatus 100 (second tactile presentation apparatus) that presents the tactile stimulus. It is to be noted that the present disclosure is able to achieve not only this effect but also various effects described hereinabove.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In addition, the effects described herein are merely illustrative or exemplary, and are not limitative. That is, the technology according to an embodiment of the present disclosure may achieve, in addition to or in place of the above effects, other effects that are obvious to those skilled in the art from the description of the present specification.

It is to be noted that the technical scope of the present disclosure also includes the following configurations.

(1)
An information processing system including:
an information processor; and
a plurality of tactile presentation apparatuses,
the plurality of tactile presentation apparatuses including
a first tactile presentation apparatus that, in a case of receiving tactile presentation information from the information processor, transmits the tactile presentation information to a peripheral tactile presentation apparatus, and
a second tactile presentation apparatus that, in a case of receiving the tactile presentation information from the peripheral tactile presentation apparatus, presents a tactile stimulus on a basis of the tactile presentation information.

(2)
The information processing system according to (1), in which
the second tactile presentation apparatus includes a plurality of second tactile presentation apparatuses, and
the second tactile presentation apparatuses present a tactile stimulus in conjunction with one another on a basis of the tactile presentation information to thereby present, to a presentation target of the tactile stimulus, a tactile stimulus to be propagated.

(3)
The information processing system according to (2), in which, in a case of receiving the tactile presentation information from the peripheral tactile presentation apparatus, the second tactile presentation apparatus transmits the tactile presentation information to another peripheral tactile presentation apparatus.

(4)
The information processing system according to (3), in which, on a basis of first tactile presentation information received from the peripheral tactile presentation apparatus, the second tactile presentation apparatus transmits second tactile presentation information reflecting a change in the tactile stimulus due to the propagation to another peripheral tactile presentation apparatus.

(5)
The information processing system according to (4), in which the second tactile presentation apparatus generates the second tactile presentation information on a basis of propagation characteristics of the tactile stimulus for an own apparatus or the peripheral tactile presentation apparatus.

(6)
The information processing system according to (4) or (5), in which the second tactile presentation apparatus performs the generation of the second tactile presentation information or the transmission of the second tactile presentation information on a basis of a position of a configuration that presents the tactile stimulus.

(7)
The information processing system according to (5) or (6), in which the second tactile presentation apparatus generates the second tactile presentation information by performing a physical simulation.

(8)
The information processing system according to any one of (1) to (7), in which
the tactile presentation information includes identification information allowing for identification of the tactile presentation information, and
the second tactile presentation apparatus determines whether or not to present the tactile stimulus using the tactile presentation information on a basis of the identification information.

(9)
The information processing system according to any one of (1) to (8), in which the second tactile presentation apparatus does not present the tactile stimulus in a case where the presentation target of the tactile stimulus is not in contact with the own apparatus.

(10)

The information processing system according to any one of (1) to (9), in which the second tactile presentation apparatus waits in a state where some of functions are stopped before or after the presentation of the tactile stimulus, in a case where the tactile presentation information is not received, or in a case where the presentation target of the tactile stimulus is not in contact with the own apparatus.

(11)

The information processing system according to any one of (1) to (10), in which the plurality of tactile presentation apparatuses each calculate identification information for identification of the own apparatus by using, as a trigger, a predetermined signal transmitted from the information processor.

(12)

The information processing system according to (11), in which the plurality of tactile presentation apparatuses each calculate the identification information on a basis of a mutual positional relationship.

(13)

The information processing system according to (12), in which the information processor generates map information indicating the positional relationship among the plurality of tactile presentation apparatuses on a basis of the identification information on each of the plurality of tactile presentation apparatuses.

(14)

The information processing system according to any one of (1) to (13), in which the tactile stimulus includes a vibration.

(15)

The information processing system according to any one of (1) to (14), in which the plurality of tactile presentation apparatuses are arranged on a ground in a state of close proximity to one another.

(16)

A tactile presentation apparatus including:
a communication unit that receives tactile presentation information from a peripheral tactile presentation apparatus; and
a tactile control section that controls presentation of a tactile stimulus on a basis of the tactile presentation information and controls providing of the tactile presentation information to another peripheral tactile presentation apparatus.

(17)

A tactile presentation method executed by a computer, the method including:
receiving tactile presentation information from a peripheral tactile presentation apparatus; and
controlling presentation of a tactile stimulus on a basis of the tactile presentation information and controlling providing of the tactile presentation information to another peripheral tactile presentation apparatus.

(18)

A storage medium storing a program that causes a computer to implement:
receiving tactile presentation information from a peripheral tactile presentation apparatus; and
controlling presentation of a tactile stimulus on a basis of the tactile presentation information and controlling providing of the tactile presentation information to another peripheral tactile presentation apparatus.

REFERENCE NUMERALS LIST 100 tactile presentation apparatus
110 control unit
111 initial setting section
112 tactile control section
113 output control section
120 communication unit
130 sensor unit
140 tactile presentation unit
150 output unit
160 storage unit
200 host apparatus
210 control unit
211 initial setting section
212 map generation section
213 tactile control section
214 output control section
220 communication unit
230 storage unit
300 content control apparatus

The invention claimed is:

1. An information processing system, comprising:
an information processor; and
a plurality of tactile presentation apparatuses including:
a first tactile presentation apparatus configured to transmit, in a case of receiving first tactile presentation information from the information processor, the first tactile presentation information to a first peripheral tactile presentation apparatus; and
a second tactile presentation apparatus of a plurality of second tactile presentation apparatuses configured to present, in a case of receiving the first tactile presentation information from the first peripheral tactile presentation apparatus, a tactile stimulus based on the first tactile presentation information.

2. The information processing system according to claim 1, wherein the plurality of second tactile presentation apparatuses are configured to present the tactile stimulus to be propagated to a presentation target of the tactile stimulus based on the first tactile presentation information.

3. The information processing system according to claim 2, wherein, in the case of receiving the first tactile presentation information from the first peripheral tactile presentation apparatus, the second tactile presentation apparatus is further configured to transmit the first tactile presentation information to propagate to a second peripheral tactile presentation apparatus which is different from the first peripheral tactile presentation apparatus.

4. The information processing system according to claim 3, wherein the second tactile presentation apparatus is further configured to transmit second tactile presentation information, which indicates a change in the tactile stimulus due to the propagation to the second peripheral tactile presentation apparatus, based on the first tactile presentation information received from the first peripheral tactile presentation apparatus.

5. The information processing system according to claim 4, wherein the second tactile presentation apparatus is further configured to generate the second tactile presentation information based on propagation characteristics of the tactile stimulus for one of the second tactile presentation apparatus or the first peripheral tactile presentation apparatus.

6. The information processing system according to claim 4, wherein the second tactile presentation apparatus is further configured to one of generate the second tactile presentation information or transmit the second tactile presentation information based on a basis of a position of a configuration that presents the tactile stimulus.

7. The information processing system according to claim 5, wherein the second tactile presentation apparatus is further configured to generate the second tactile presentation information based on a physical simulation.

8. The information processing system according to claim 1, wherein
the first tactile presentation information includes identification information which allows for identification of the first tactile presentation information, and
the second tactile presentation apparatus is further configured to determine whether to present the tactile stimulus using the first tactile presentation information based on of the identification information.

9. The information processing system according to claim 1, wherein the second tactile presentation apparatus is further configured to not present the tactile stimulus in a case where a presentation target of the tactile stimulus is not in contact with the second tactile presentation apparatus.

10. The information processing system according to claim 1, wherein the second tactile presentation apparatus is further configured to wait in a state where some of functions are stopped before or after the presentation of the tactile stimulus, in one of a case where the first tactile presentation information is not received, or a case where a presentation target of the tactile stimulus is not in contact with the second tactile presentation apparatus.

11. The information processing system according to claim 1, wherein each of the plurality of tactile presentation apparatuses is configured to calculate identification information for identification of respective tactile presentation apparatus of the plurality of tactile presentation apparatuses by using, as a trigger, a specific signal transmitted from the information processor.

12. The information processing system according to claim 11, wherein the identification information is calculated based on a mutual positional relationship among the of the plurality of tactile presentation apparatuses.

13. The information processing system according to claim 12, wherein the information processor is further configured to generate map information indicating the mutual positional relationship among the plurality of tactile presentation apparatuses based on the identification information on each of the plurality of tactile presentation apparatuses.

14. The information processing system according to claim 1, wherein the tactile stimulus comprises a vibration.

15. The information processing system according to claim 1, wherein the plurality of tactile presentation apparatuses is arranged on a ground in a state of close proximity with each other.

16. A tactile presentation apparatus, comprising:
a communication unit configured to receive tactile presentation information from a first peripheral tactile presentation apparatus; and
a tactile control section configured to:
control a presentation of a tactile stimulus based on the tactile presentation information, and
control transmission of the tactile presentation information to a second peripheral tactile presentation apparatus which is different from the first peripheral tactile presentation apparatus.

17. A tactile presentation method comprising:
receiving tactile presentation information from a first peripheral tactile presentation apparatus;
controlling a presentation of a tactile stimulus based on the tactile presentation information; and
controlling providing of the tactile presentation information to a second peripheral tactile presentation apparatus which is different from the first peripheral tactile presentation apparatus.

18. A non-transitory computer-readable medium having stored thereon, computer-executable instructions which, when executed by a processor, cause the processor to execute operations, the operations comprising:
receiving tactile presentation information from a first peripheral tactile presentation apparatus;
controlling a presentation of a tactile stimulus based on the tactile presentation information; and
controlling providing of the tactile presentation information to a second peripheral tactile presentation apparatus which is different from the first peripheral tactile presentation apparatus.

* * * * *